(12) United States Patent
Wang et al.

(10) Patent No.: US 12,099,855 B2
(45) Date of Patent: Sep. 24, 2024

(54) DATA PROCESSING METHOD AND APPARATUS, COMPUTER DEVICE, AND READABLE STORAGE MEDIUM

(71) Applicant: Tencent Technology (Shenzhen) Company Limited, Shenzhen (CN)

(72) Inventors: Jian Wang, Shenzhen (CN); Maoyang Pu, Shenzhen (CN); Qin Qin, Shenzhen (CN); Zhenzhen Yuan, Shenzhen (CN); Bing Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 98 days.

(21) Appl. No.: 17/965,668

(22) Filed: Oct. 13, 2022

(65) Prior Publication Data
US 2023/0033236 A1 Feb. 2, 2023

Related U.S. Application Data

(63) Continuation of application No. PCT/CN2022/072688, filed on Jan. 19, 2022.

(30) Foreign Application Priority Data

Jan. 25, 2021 (CN) .......................... 202110098915.0

(51) Int. Cl.
*H04L 9/32* (2006.01)
*G06F 9/448* (2018.01)
(Continued)

(52) U.S. Cl.
CPC ........... *G06F 9/4488* (2018.02); *G06Q 20/42* (2013.01); *H04L 9/50* (2022.05)

(58) Field of Classification Search
CPC .......... G06F 9/4488; H04L 9/50; G06Q 20/42
See application file for complete search history.

(56) References Cited

U.S. PATENT DOCUMENTS

| 2013/0282380 | A1  |    | 10/2013 | Mauro et al. |              |
|--------------|-----|----|---------|--------------|--------------|
| 2018/0108004 | A1  | *  | 4/2018  | Jin          | H04L 63/0428 |
| 2019/0235946 | A1  | *  | 8/2019  | Guo          | H04L 67/1097 |
| 2020/0273034 | A1  | *  | 8/2020  | Han          | G06Q 20/34   |
| 2022/0405852 | A1  | *  | 12/2022 | Fohr         | G06Q 20/3821 |

FOREIGN PATENT DOCUMENTS

| CN | 103745540 A | 4/2014 |
|----|-------------|--------|
| CN | 106909596 A | 6/2017 |

(Continued)

OTHER PUBLICATIONS

Xiaoyi Chen et al., A Dialog Robot Based on WeChat, 20, [Retrieved on May 20, 2024]. Retrieved from the internet: <URL: https://eudl.eu/pdf/10.1007/978-3-319-94965-9_13> 11 Pages (122-132) (Year: 2018).*

(Continued)

*Primary Examiner* — Anibal Rivera
(74) *Attorney, Agent, or Firm* — Morgan, Lewis & Bockius LLP

(57) ABSTRACT

Embodiments of this application provide a data processing method and apparatus, a computer device, and a readable storage medium. The method includes: setting a state machine of a resource data transfer service to a first state in response to a start request for the resource data transfer service, the start request carrying a state identifier of the first state; executing a first service logic corresponding to the first state, to obtain an execution result of the first service logic; adjusting the state machine to a second state according to the execution result of the first service logic, and executing a second service logic corresponding to the second state, to obtain an execution result of the second service logic; and outputting a service execution result of the resource data transfer service according to the execution result of the (Continued)

second service logic when the second state is a termination state, a service logic of the resource data transfer service including at least the first service logic and the second service logic. In this way, the implementations of the resource data transfer service can be enriched.

17 Claims, 14 Drawing Sheets

(51) Int. Cl.
*G06Q 20/10* (2012.01)
*G06Q 20/40* (2012.01)
*G06Q 20/42* (2012.01)
*H04L 9/00* (2022.01)

(56) References Cited

FOREIGN PATENT DOCUMENTS

| CN | 108764864 A | 11/2018 |
|---|---|---|
| CN | 111144982 A | 5/2020 |

OTHER PUBLICATIONS

Tencent Technology, WO, PCT/CN2022/072688, Apr. 19, 2022, 5 pgs.
Tencent Technology, Iprp, PCT/CN2022/072688, Jul. 20, 2023, 6 pgs.
Tencent Technology, ISR, PCT/CN2022/072688, Apr. 19, 2022, 2 pgs.

* cited by examiner

DATA PROCESSING METHOD AND APPARATUS, COMPUTER DEVICE, AND READABLE STORAGE MEDIUM

CROSS-REFERENCE TO RELATED APPLICATIONS

This application is a continuation application of PCT Patent Application No. PCT/CN2022/072688, entitled "DATA PROCESSING METHOD AND APPARATUS, COMPUTER DEVICE, AND READABLE STORAGE MEDIUM" filed on Jan. 19, 2022, which claims priority to Chinese Patent Application No. 202110098915.0, filed with the State Intellectual Property Office of the People's Republic of China on Jan. 25, 2021, and entitled "DATA PROCESSING METHOD AND APPARATUS, COMPUTER DEVICE, AND READABLE STORAGE MEDIUM", all of which are incorporated herein by reference in their entirety.

FIELD OF THE TECHNOLOGY

This application relates to the field of Internet technologies, and in particular, to data processing technology.

BACKGROUND OF THE DISCLOSURE

Currently, in response to continuous development of Internet technologies, various payment services such as red packet payment and transfer have emerged. Taking the red packet payment service as an example, the red packet payment service is mainly implemented in an event-driven manner. Basic principles are as follows: When it is detected that a user is sending a red packet, it is determined whether the balance is sufficient for sending the red packet. If so, resource data is transferred out of an account of the sender of the red packet, and a red packet sending record is added to a database. The database includes a number of times the red packet is accepted and a resource data amount. In a stage of accepting the red packet, it is determined whether a current number of times the red packet is accepted exceeds an acceptance number set during sending of the red packet. Users are allowed to accept the red packet only when the current number of times the red packet is accepted is less than the acceptance number. After the red packet is accepted, a record of red packet receipt is inserted into the database, and the resource data is transferred to an account of an acceptor of the red packet. It can be learned that the existing red packet payment service is executed in sequence according to a preset logic. Such implementation of the resource data transfer service is dull.

SUMMARY

Embodiments of this application provide a data processing method and apparatus, a computer device, and a readable storage medium, which can enrich the implementations of a resource data transfer service, and can implement the resource data transfer service more effectively.

An aspect of the embodiments of this application provides a data processing method performed by a computer device, the method including:

setting a state machine of a resource data transfer service to a first state in response to a start request for the resource data transfer service, the start request carrying a state identifier of the first state;

executing a first service logic corresponding to the first state, to obtain an execution result of the first service logic;

adjusting the state machine to a second state according to the execution result of the first service logic, and executing a second service logic corresponding to the second state, to obtain an execution result of the second service logic; and outputting a service execution result of the resource data transfer service according to the execution result of the second service logic when the second state is a termination state, a service logic of the resource data transfer service including at least the first service logic and the second service logic.

An aspect of the embodiments of this application provides a data processing apparatus. The apparatus includes:

a processing unit, configured to set a state machine of a resource data transfer service to a first state in response to a start request for the resource data transfer service, the start request carrying a state identifier of the first state;

the processing unit being further configured to execute a first service logic corresponding to the first state, to obtain an execution result of the first service logic; and the processing unit being further configured to adjust the state machine to a second state according to the execution result of the first service logic, and execute a second service logic corresponding to the second state, to obtain an execution result of the second service logic; and an output unit, configured to output a service execution result of the resource data transfer service according to the execution result of the second service logic when the second state is a termination state, a service logic of the resource data transfer service including at least the first service logic and the second service logic.

An aspect of the embodiments of this application provides a computer device, including a processor and a memory, the processor being connected to the memory, the memory being configured to store program instructions, and the processor being configured to invoke the program instructions, to perform the foregoing data processing method.

An aspect of the embodiments of this application provides a non-transitory computer-readable storage medium, storing program instructions, the program instructions, when executed by a processor of a computer device, causing the computer device to implement the foregoing data processing method.

An aspect of the embodiments of this application provides a computer program product or a computer program. The computer program product or the computer program includes computer instructions. The computer instructions are stored in a non-transitory computer-readable storage medium, and when executed by a processor of a computer device, perform the foregoing data processing method.

In the embodiments of this application, during the implementation of the resource data transfer service, the state machine is used to adjust the state of the resource data transfer service, thereby finally implementing the resource data transfer service, which enriches the implementation of the resource data transfer service. Further, using the state machine can help orderly perform the state transition of the entire resource data transfer service, thereby facilitating maintenance. In this way, the resource data transfer service can be implemented more effectively.

DESCRIPTION OF EMBODIMENTS

Figure 1A:
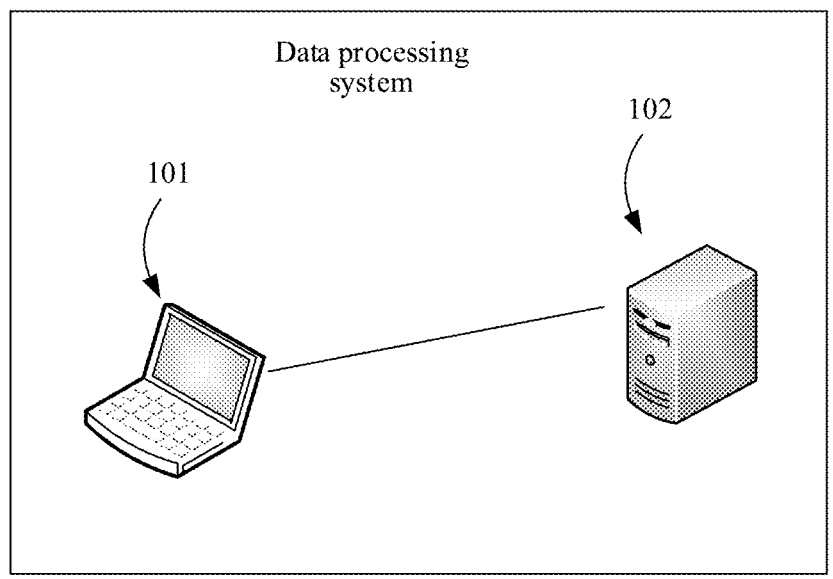
FIG. 1a is a schematic structural diagram of a data processing system according to an embodiment of this application.

In order to understand an implementation process of a resource data transfer service more effectively, a data processing system provided in embodiments of this application is first described below. Referring to FIG. 1a, the data processing system may include a terminal device 101 and a server 102. The terminal device 101 and the server 102 may communicate directly or indirectly through wired or wireless communication. The terminal device 101 is a device capable of implementing a resource data transfer service, or the terminal device 101 runs an application capable of implementing a resource data transfer service. For example, the application may be a payment application. The terminal device 101 may be a mobile phone, a tablet computer, a notebook computer, a palmtop computer, a mobile Internet device (MID), a wearable device and the like. The server 102 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

During actual application, the data processing system may be deployed based on a blockchain network, that is, the terminal device and the server both may be deployed in the blockchain network. Alternatively, the terminal device is deployed outside the blockchain network, and the server is deployed in the blockchain network. When the server is deployed in the blockchain network and the server is a server cluster composed of a plurality of physical servers or a distributed system, each server may be used as a node in the blockchain network. The blockchain is a new application mode of computer technologies such as distributed data storage, point-to-point transmission, a consensus mechanism, and an encryption algorithm. The blockchain is essentially a decentralized database, and is a string of associated data blocks generated by using a cryptology method. Data (such as a plurality of states of a state machine and a service logic corresponding to each state) in a data processing method disclosed in this application may be stored in the blockchain.

Based on the above data processing system, this application is applicable to the following scenarios: When game currencies are required to be transferred through a game APP, the solution of this application may be used to transfer the game currencies by a state machine for transferring game currencies. During specific implementation, a plurality of states may be configured for the state machine according to the process of transferring the game currencies, and then a current state of the state machine for transferring game currencies may be determined (for example, the current state is a game currency purchasing state) according to an operation performed by a user for transferring the game currencies, and the following service logic in the current state of the state machine is executed: receiving payment passwords entered by the user, and transferring the game currencies to a game account of the user. After the payment passwords entered by the user are successfully received and are authenticated, the game currencies are transferred to the game account of the user. After the game currencies are successfully transferred in, the state machine is adjusted from the state of purchasing game currencies to a purchase succeeded state. When a state is determined as a termination state of the state machine, a result of transferring the game currencies may be outputted according to a service execution result of the state.

When invoices are required to be transferred through a tax APP, the solution of this application may be used to transfer the invoices by a state machine for transferring invoices. During specific implementation, a plurality of states may be configured for the state machine according to the process of transferring the invoices, and then a current state of the state machine for transferring invoices may be determined (for example, the current state is an invoice generated state) according to an operation performed by a user for transferring the invoices, and the following service logic in the current state of the state machine is executed: transferring the generated invoices to a merchant; and adjusting the state machine from the invoice generated state to an invoice transferred state after the invoices are successfully transferred to the merchant. When a state is determined as a termination state of the state machine, a result of transferring the invoices may be output according to a service execution result of the state.

When legal currencies are required to be transferred through a payment APP, the solution of this application may be used to transfer the legal currencies by a state machine. There are multiple states. During specific implementation, a plurality of required states may be configured for the state machine according to the process of transferring the legal currencies. During transfer of the legal currencies, a current state of the state machine for transferring legal currencies may be determined according to an operation performed by a user for transferring the legal currencies, a service logic corresponding to the current state of the state machine is executed, and a next state of the state machine is determined according to an execution result of the service logic, so as to transfer the legal currencies by continuously adjusting the state of the state machine.

Figure 1B:
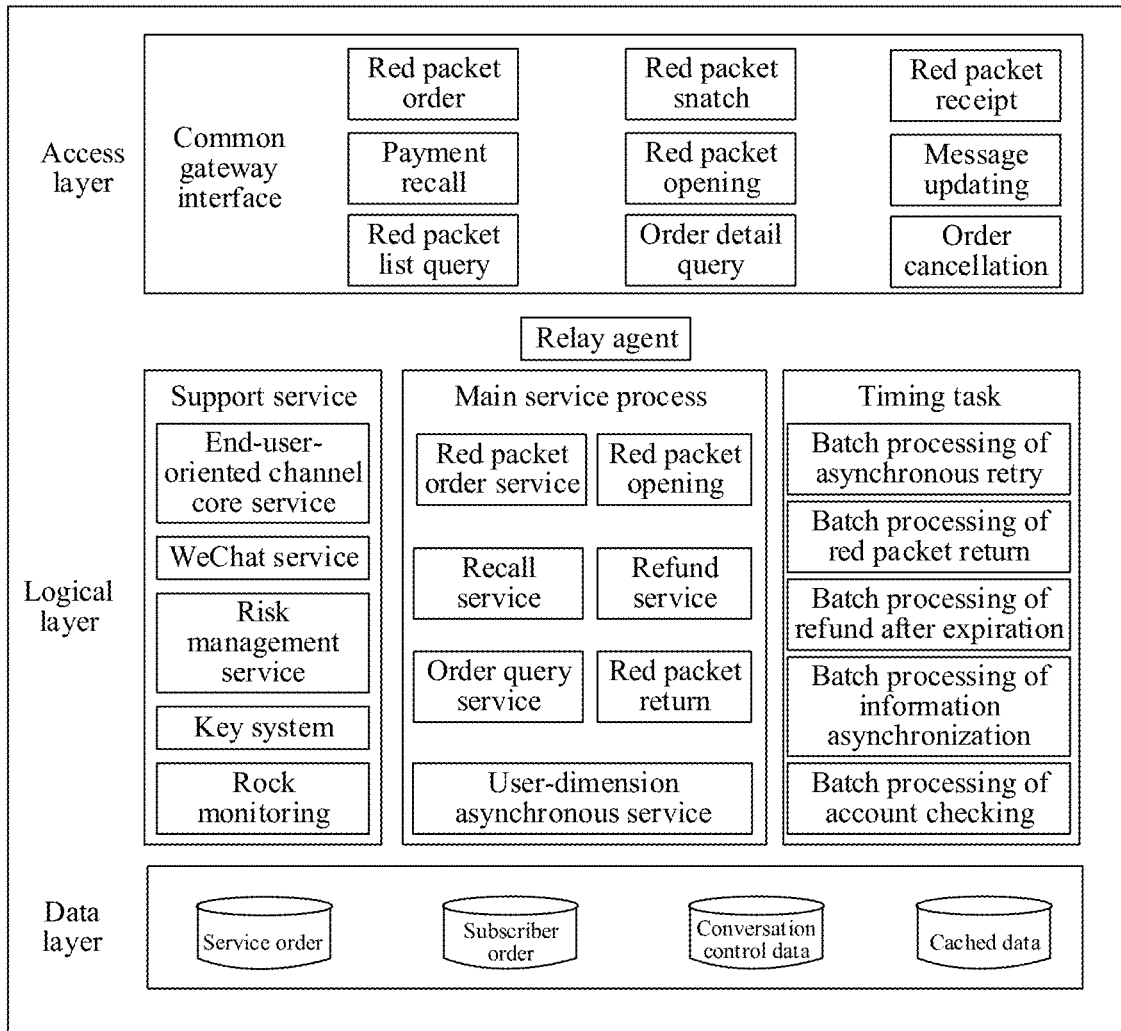
FIG. 1B is an architectural diagram of a more detailed data processing system according to an embodiment of this application.

In an implementation, when the resource data transfer service is a resource transfer service based on a red packet form, the embodiments of this application further provide a specific architecture of the data processing system. As shown in FIG. 1B, the data processing system includes an access layer, a logical layer, and a data layer. The access layer is mainly configured to verify a login identity of a user and limit an operating frequency of a computer device. The logic layer is mainly configured to implement a main process of the entire red packet transfer service, including sending red packets, accepting red packets, returning red packets, and the like. In the embodiments of this application, the process of the entire red packet service may be controlled through a state machine. During specific implementation, a plurality of states may be configured for the state machine of the red packet service, and then the state of the state machine may be adjusted to implement the entire red packet transfer service. In addition, in the process of continuously optimizing the red packet service process, new states may be continuously added to the state machine according to the optimization of the red packet service process. The data layer is mainly configured to store service orders, user orders, and the like.

Figure 2A:
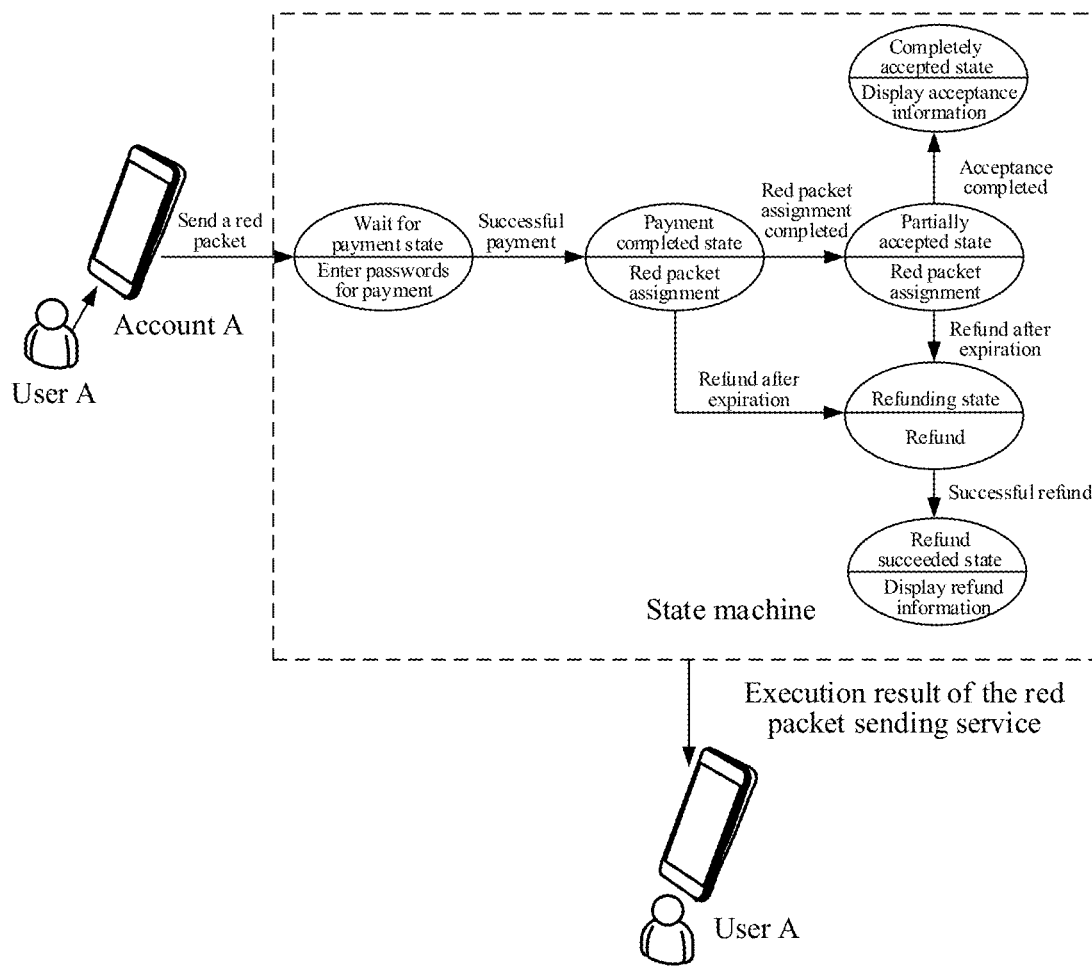
FIG. 2a is a schematic diagram of a specific scenario of a data processing method according to an embodiment of this application.
Figure 2B:
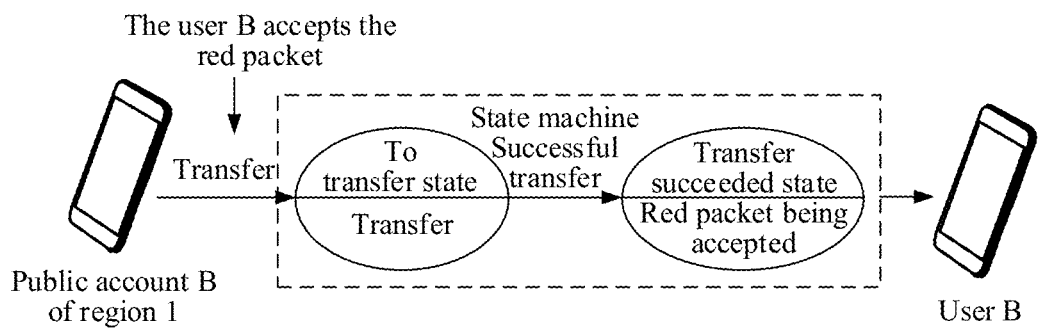
FIG. 2b is a schematic diagram of a specific scenario of another data processing method according to an embodiment of this application.
Figure 2C:
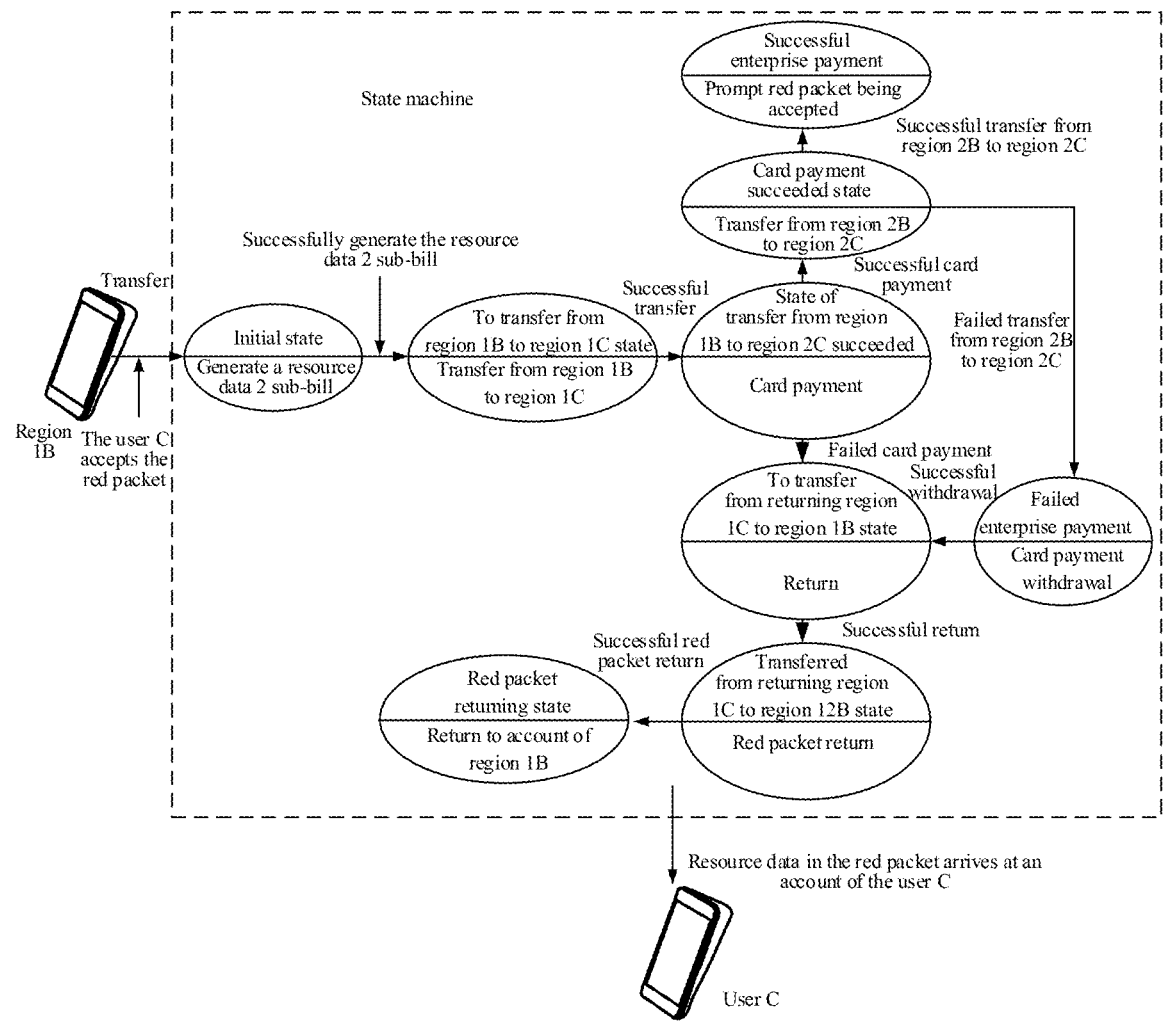
FIG. 2c is a schematic diagram of a specific scenario of still another data processing method according to an embodiment of this application.

The data processing method provided in the embodiments of this application may be performed by a computer device. The computer device may be the terminal device 101 or the server 102 in the above data processing system. Detailed description is provided below by using an example in which the resource data transfer service is implemented by the computer device:

FIG. 2*a* to FIG. 2*c* are schematic diagrams of a scenario of a data processing method according to an embodiment of this application. FIG. 2*a* illustrates a resource data transfer-out service in the resource data transfer service provided in the embodiments of this application. For example, the resource data transfer-out service is a red packet sending service. As shown in FIG. 2*a*, when a user A sends red packets through an account A, a computer device (corresponding to a mobile phone used by the user A) can correspondingly accept a start request for sending red packets. At this time, the computer device may set a state of a state machine of the red packet service to: wait for user payment state. Then, the computer device may determine a first service logic in the "wait for user payment state". Assuming that the first service logic is to receive payment passwords entered by the user and transfer out resource data, after the user enters the payment passwords and the payment passwords entered by the user are authenticated, a resource data transfer-out operation is performed. After the resource data is successfully transferred out, the state machine is adjusted from the "wait for user payment state" to a payment completed state. In the payment completed state, resource data of the red packets sent by the user A may be stored in a public account B of a corresponding region, so that users can subsequently transfer the red packets from the public account B of the corresponding region to accounts of the users accepting the red packets.

After the state machine of the red packet service is adjusted from the "wait for user payment state" to the "payment completed state", the computer device may determine whether the "payment completed state" is a termination state. When the computer device determines that the "payment completed state" is not a termination state, the computer device may execute a second service logic corresponding to the "payment completion state". The second service logic is to allocate the resource data in the red packets to the users. It may be understood that, when a user successfully accepts the resource data in the corresponding red packet, a number of accepted red packets is increased. When different users perform the red packet accepting operation, the computer device correspondingly increases the number of accepted red packets by 1 each time the red packet accepting operation is performed. Subsequently, the computer device may determine whether the number of accepted red packets is less than a total number of red packets sent by the user A. If the number of accepted red packets is less than the total number of sent red packets, the computer device may adjust the state machine from the "payment completed state" to a "partially accepted state". A service logic in the "partially accepted state" is: allocating the resource data in the red packets to the users. When the user performs clicks/taps "Accept the red packet", the computer device correspondingly executes the service logic in the "partially accepted state". If the number of accepted red packets is less than the total number of red packets sent by the user A, but a valid time of the sent red packets exceeds a preset time, which means that no user subsequently accepts the red packets sent by the user A, and the red packets sent by the user A have expired, the computer device needs to return the expired red packets to the user A. The computer device may adjust the state machine from the "partially accepted state" to a "refunding state", and then executes a service logic corresponding to the "refunding state": returning the resource data in the red packets. When determining that the state of the state machine is a termination state such as a completely accepted state or a refund succeeded state, the computer device outputs a service execution result of the resource data transfer service according to an execution result of a service logic in the completely accepted state or an execution result of a service logic in the refund succeeded state.

FIG. 2*b* to FIG. 2*c* show a cross-regional resource transfer-in service in the resource data transfer service provided in the embodiments of this application. The cross-regional resource transfer-in service may be, for example, for example, a red packet service crossing a region 1 and a region 2. For example, a user A and a user B are in a region 1, a user C is in a region 2, and a red packet service is executed. After the user B clicks/taps a red packet sent by the user A, the computer device may transfer resource data stored in a red packet of a public account B of the region 1 to an account of the user B. During specific implementation, the resource data stored in the red packet of the public account B of the region 1 is transferred to the account of the user B mainly by adjusting a state of a state machine. As shown in FIG. 2*b*, when the user B clicks/taps the red packet sent by the user A, the computer device correspondingly receives a start request for the red packet service. The computer device may set the state machine for accepting the red packet to an initial state, that is, a "to transfer state". A service logic of the "to transfer state" is to perform transfer from the public account B of the region 1 to the user B. The computer device performs transfer from the public account B of the region 1 to the user B. When the red packet is successfully transferred from the public account B of the region 1 to the user B of the region 1, the user B of the region 1 successfully accepts resource data in the red packet. The computer device adjusts the state machine from the "to transfer state" to a "transfer succeeded state". The resource data of the red packet stored in the public account B of the region 1 is resource data suitable for use in the region 1.

Since the user C and the user A are not in the same region, for security of the fund payment, after the user C clicks/taps the red packet sent by the user A, the computer device may first transfer the resource data stored in the red packet of the public account B of the region 1 to a public account C of the region 1 in response to the clicking/tapping operation performed by the user C (that is, in response to receiving a start request for the resource data transfer service), secondly causes the public account C of the region 1 to perform card payment to fuse resource data stored in the public account C through a wallet and thereby realize conversion the resource data 1 (resource data suitable for use in the region 1) and resource data 2 (resource data suitable for use in the region 2), then transfer the resource data from the public account B of the region 2 to a public account C of the region 2, and finally transfer the resource data to the account of the user C through a public account C of the region 2. FIG. 2c shows a process of implementing acceptance of the resource data in the red packet of the user A by the user C by adjusting the state of the state machine. During specific implementation, after the user C clicks/taps the red packet sent by the user A, the computer device correspondingly receives a start request for the red packet service. The computer device may set the state machine for accepting the red packet to an initial state. A first service logic of the "initial state" is: calculating the resource data 1 accepted by the user C, converting the accepted resource data 1 to resource data 2, and generating a sub-ill for resource data 2. Then, the computer device executes the first service logic, adjusts the state machine of the red packet service from the "initial state" to a "to transfer from the public account B of the region 1 (referred to as a region 1B for short in FIG. 2c) to the public account C of the region 1 (referred to as a region 1C for short in FIG. 2c) state" after generating the sub-bill for resource data 2, determines a second service logic of the "to transfer from the public account B of the region 1 to the public account C of the region 1 state" is to perform transfer from the public account B of the region 1 to the public account C of the region 1, and to perform transfer from the public account B of the region 1 to the public account C of the region 1.

The computer device needs to determine whether the "to transfer from the public account B of the region 1 to the public account C of the region 1 state" is a termination state. If the "to transfer from the public account B of the region 1 to the public account C of the region 1 state" is a non-termination state, the computer device may adjust the state machine from the "to transfer from the public account B of the region 1 to the public account C of the region 1 state" to a "successful transfer from the public account B of the region 1 to the public account C of the region 1 state" after successful transfer from the public account B of the region 1 to the public account C of the region 1, and executes a third service logic corresponding to the "successful transfer from the public account B of the region 1 to the public account C of the region 1 state". The public account C of the region 1 performs is caused to perform card payment. Next, the computer device determines whether the "successful transfer from the public account B of the region 1 to the public account C of the region 1 state" is a termination state. If the "successful transfer from the public account B of the region 1 to the public account C of the region 1 state" is a non-termination state, the computer device may adjust the "successful transfer from the public account B of the region 1 to the public account C of the region 1 state" to a "card payment succeeded state" after the card payment by the public account C of the region 1 succeeds. A service logic corresponding to the card payment succeeded state is to perform transfer from a public account B of the region 2 (referred to as a region 2B for short in FIG. 2c) to a public account C of the region 2 (referred to as a region 2C for short in FIG. 2c). After it is determined that the card payment succeeded state is a non-termination state, transfer is performed from the public account B of the region 2 to the public account C of the region 2. When the state machine is in the termination state (such as a state of enterprise payment succeeded or a red packet returning state), the computer device may output a service execution result of the red packet accepting service according to an execution result of a service logic of the state of enterprise payment succeeded by an enterprise or the red packet returning state.

In this application, during the implementation of the resource data transfer service, the state machine may be used to control the resource data transfer in the resource data transfer service, which enriches the implementation of the resource data transfer service. Further, using the state machine in the above process can help orderly perform the state transition of the entire resource data transfer service, thereby facilitating maintenance. In this way, the resource data transfer service can be implemented more effectively.

Figure 3:
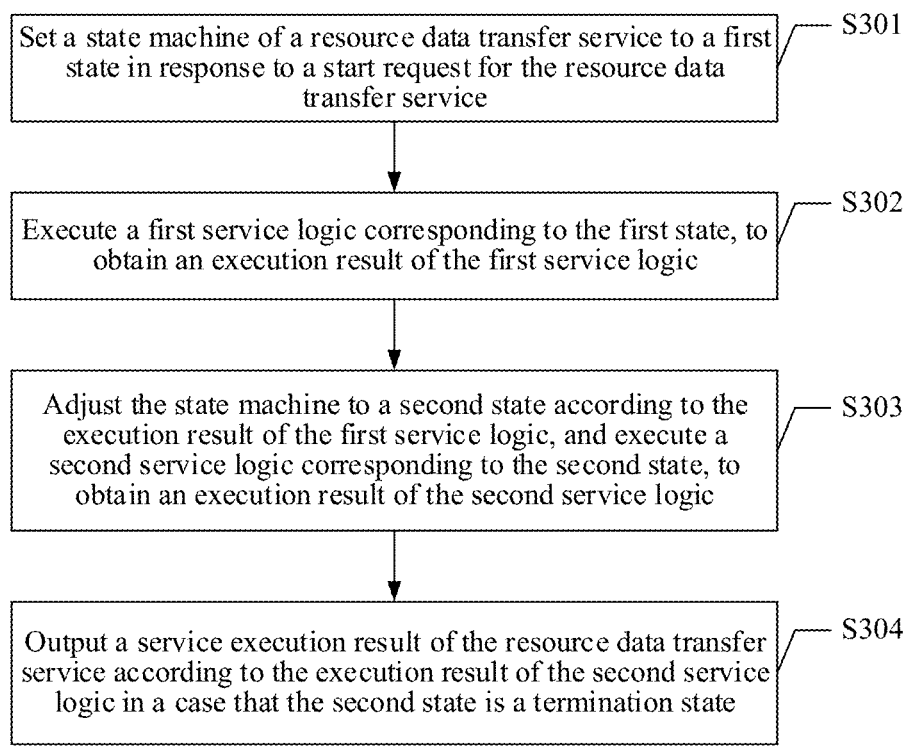
FIG. 3 is a schematic flowchart of a data processing method according to an embodiment of this application.

FIG. 3 is a schematic flowchart of a data processing method according to an embodiment of this application. The method may be performed by a computer device. The computer device configures corresponding state machines for different services. The data processing method described in this embodiment may include the following steps S301-S304:

S301: Set a state machine of a resource data transfer service to a first state in response to a start request for the resource data transfer service.

The resource data transfer service may be specifically a game currency transfer service, an invoice transfer service, a legal currency transfer service, or the like. In an electronic red packet scenario, the resource data transfer service may specifically include a resource transfer-in service and a resource transfer-out service. The resource transfer-in service may be a red packet accepting service. The resource transfer-out service may be a red packet sending service.

During specific implementation, the state machine has a plurality of states configured for the resource data transfer service, and each of the plurality of states has a corresponding state identifier. The plurality of states are configured for the state machine of the resource data transfer service, and the state identifier corresponding to the state may be stored in a local space of the computer device or in a blockchain network, to prevent tampering with the plurality of states of the state machine and the state identifier corresponding to the state. Correspondingly, when receiving the start request for the resource data transfer service, the computer device may first acquire the state identifier of the first state from the local space or from the blockchain network, and set the state machine of the resource data transfer service to the first state.

In a possible implementation, the start request may be a request generated in response to a resource data transfer operation. In this case, the state identifier of the first state is a state identifier of a preset initial state, and the computer device sets the initial state as the first state. The resource data transfer operation may be an operation of clicking/tapping a control used for triggering the resource data transfer service. For example, a user may click/tap a control for sending red packets or a control for accepting red packets. The resource data transfer operation may alternatively be an operation of entering an instruction or a password for resource data transfer performed by a user.

In another possible implementation, during execution of the resource data transfer service, the state adjustment of the state machine may fail due to poor network quality, system jitter, or the like. When the network quality is improved or the system becomes stable, resource data transfer is required to be re-executed from a breakpoint. In this case, the start request may be a breakpoint restart request generated in response to failed state adjustment of the state machine, and the state identifier of the first state is a state identifier of a state of the state machine in response to the failed state adjustment of the state machine.

Specifically, the computer device stores a state adjustment history of the state machine. When receiving the breakpoint restart request generated in response to the failed state adjustment of the state machine, the computer device may acquire the state adjustment history, determine the state identifier of the state of the state machine in response to the failed state adjustment, and determines the state identifier of the state of the state machine as the state identifier of the first state. The state adjustment history may be stored in the blockchain network.

S302: Execute a first service logic corresponding to the first state, to obtain an execution result of the first service logic.

During specific implementation, the state of the state machine corresponds to a service logic, and the service logic corresponding to the state may be stored in the local space of the computer device or uploaded and stored to the blockchain network to prevent tempering with. The computer device may first determine the first service logic from the local space or the blockchain network according to the first state, and then execute the first service logic.

In an embodiment, when the resource data transfer service is the resource transfer-out service (such as sending red packets), the state machine of the resource transfer-out service corresponds to few states, and there is only one fund flowing action, namely, payment, and the state of the state machine is relatively fixed. When the state machine of the resource data transfer service has few states, the computer device may determine the first service logic based on implementation of a state machine with an ordinary process.

In another embodiment, when the resource data transfer service is the resource transfer-in service (such as accepting red packets), the resource transfer-in service has many fund flowing actions, and correspondingly, the state machine has many states. When the state machine of the resource data transfer service has many states, using the above state machine based on the ordinary process easily causes logical code confusion, which brings more development difficulty and less development efficiency to developers. In addition, when a new state is required to be added to the state machine, the state machine based on the ordinary process is highly invasive to an original code module. Therefore, when the state machine has many states, in order to realize desirable extendability and flexibility of the state machine, the computer device may determine the first service logic based on a state machine of a state pattern.

The state machine based on the ordinary process means that each state of the state machine corresponds to a process-oriented state determination condition, and a corresponding service logic may be determined and executed according to each state determination condition. The state machine based on the state pattern means that each state of the state machine corresponds to an object-oriented state class, and a corresponding service logic may be determined and executed based on each state class. Whether the state of the state machine corresponds to the process-oriented state determination condition or the state of the state machine corresponds to the object-oriented state class depends on the number of states corresponding to the state machine. During specific implementation, when the number of states corresponding to the state machine is less than a preset value, the state of the state machine may correspond to the process-oriented state determination condition. When the number of states corresponding to the state machine is greater than or equal to the preset value, the state of the state machine may correspond to the object-oriented state class.

S303: Adjust the state machine to a second state according to the execution result of the first service logic, and execute a second service logic corresponding to the second state, to obtain an execution result of the second service logic.

During specific implementation, a state transition logic may be configured in advance according to state transition requirements of the resource data transfer service, and the computer device may compare the state transition logic with the execution result of the first service logic, and then adjust the state machine from the first state to the second state according to a comparison result, and then determines the corresponding second service logic according to the second state, and executes the second service logic.

In an embodiment, after adjusting the state machine to the second state according to the execution result of the first service logic, the computer device may determine whether the second state is a termination state. When the second state is a non-termination state, the state of the state machine may be adjusted according to the execution result of the second service logic, and the service execution result of the resource data transfer service is outputted based on the adjusted state. It may be understood that, when the second state is a non-termination state, the computer device may use the current second state as a new first state, use the second service logic of the current second state as a new first service logic, and use the execution result of the current second service logic as an execution result of the new first service logic, and then determine a new second state according to the execution result of the new first service logic, and so on.

S304: Output a service execution result of the resource data transfer service according to the execution result of the second service logic when the second state is a termination state.

A service logic of the resource data transfer service includes at least the first service logic and the second service logic. During specific implementation, the computer device outputs a final resource data transfer status of the resource data transfer service according to the execution result of the second service logic.

In this embodiment of this application, during the implementation of the resource data transfer service, the state machine is used to control adjustment of the state of the resource data transfer service, thereby finally implementing the resource data transfer service, which enriches the implementation of the resource data transfer service. Further, using the state machine in the above process can help orderly perform the state transition of the entire resource data transfer service, thereby facilitating maintenance. In this way, the resource data transfer service can be implemented more effectively.

Figure 4:
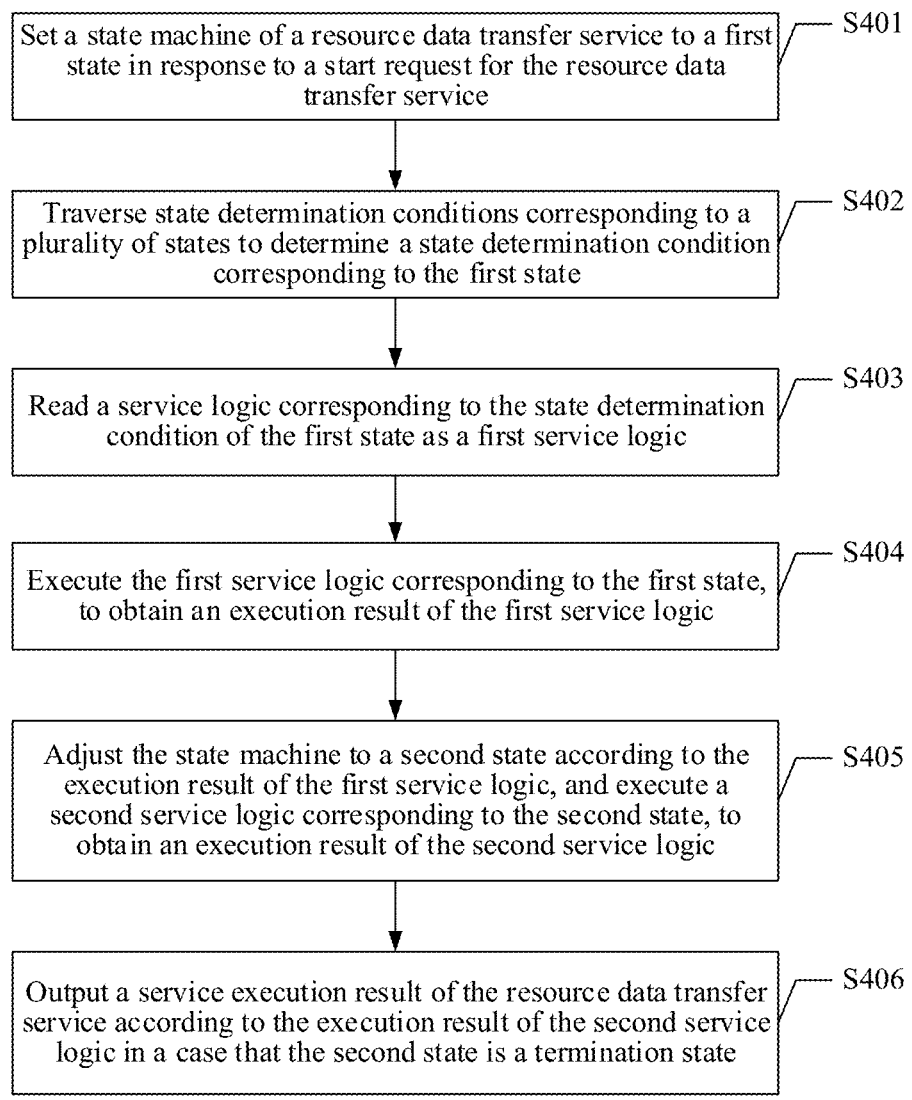
FIG. 4 is a schematic flowchart of a data processing method according to an embodiment of this application.

FIG. 4 is a schematic flowchart of a data processing method according to an embodiment of this application. The method may be performed by a computer device. The computer device configures corresponding state machines for different services. The data processing method described this embodiment is described by using an example in which the resource data transfer service is a resource data transfer-out service, and may include the following steps S401-S406:

S401: Set a state machine of a resource data transfer service to a first state in response to a start request for the resource data transfer service.

The start request carries a state identifier of the first state.

S402: Traverse state determination conditions corresponding to a plurality of states to determine a state determination condition corresponding to the first state.

The state machine corresponds to a plurality of states, and each of the states corresponds to a process-oriented state determination condition. During specific implementation, the computer device traverses the state determination conditions corresponding to the plurality of states according to the first state, so as to determine the state determination conditions corresponding to the first state, and performs step S403. For example, if the first state is a payment completed state, the computer device may traverse all of the state determination conditions to determine whether the payment completed state. If the payment completed state is successfully traversed from all of the state determination conditions, a state determination condition corresponding to the payment completed state may be determined.

S403: Read a service logic corresponding to the state determination condition of the first state as a first service logic.

The state determination condition of the state corresponds to a service logic. For example, when the resource data transfer service is the resource transfer-out service, the first service logic corresponding to the first state may include allocating resource data packets, collecting statistics on a number of transferred resource data packets, and the like.

S404: Execute the first service logic corresponding to the first state, to obtain an execution result of the first service logic.

In an embodiment, in step S403, the first state is a partial resource packets transferred out state, and the first service logic corresponding to the state determination condition of the first state is to allocate resource data in the resource data packets to a corresponding user according to an accepting operation triggered by the user, and collect statistics on a number of transferred resource data packets (in an electronic red packet scenario, the number of transferred resource data packets is a number of accepted red packets). A finally obtained execution result of the first service logic is the number of transferred resource data packets.

S405: Adjust the state machine to a second state according to the execution result of the first service logic, and execute a second service logic corresponding to the second state, to obtain an execution result of the second service logic.

Based on the execution result of the first service logic which is the number of transferred resource data packets, the computer device acquires a total number of resource data packets (in the electronic red packet scenario, the total number of resource data packets is a total number of red packets sent by a user), and determines whether the number of transferred resource data packets is less than the total number of resource data packets. If the number of transferred resource data packets is equal to the total number of resource data packets, the state machine is adjusted to an all resources transferred out state as the second state of the state machine. If the number of transferred resource data packets is less than the total number of resource data packets, it is necessary to further determine whether a valid timestamp of the resource data packets exceeds a preset timestamp. For example, the preset timestamp may be 12 hours, 24 hours, or the like. During actual application, the preset timestamp may be set as required. If the valid timestamp of the resource data packets exceeds the preset timestamp, the state machine is adjusted to a resource returning state as the second state of the state machine. If the valid timestamp of the resource data packets does not exceed the preset timestamp, the state of the state machine is not changed, that is, a partial resources accepted state is used as the second state. The state adjustment process of the state machine is as follows:

If(partial resources accepted state)
  allocate resource data in the resource data packets;
  collect statistics on the number of transferred resource data packets recv_num;
  If(number of transferred resource data packets recv_num<total number of resource data packets total_num)
    state=partial resources accepted state
  else if(number of transferred resource data packets recv_num=total number of resource data packets total_num)
    state=all resources transferred out state
  else if(expire)
    Return
    state=resource returning state Further, after the second state is determined, it may be first determined whether the second state is a termination state. If the second state is a non-termination state, the computer device traverses the state determination conditions corresponding to the plurality of states again to determine the state determination condition corresponding to the second state, and reads a second service logic corresponding to the state determination condition, and then executes the second service logic, so as to adjust the state of the state machine according to an execution result of the second service logic. In this case, the second state may be used as a new first state, the adjusted state of the state machine may be used as a new second state, and it is determined again whether the new second state is a termination state, and so on, until a termination state occurs. A service execution result of the resource data transfer service is outputted according to a service logic result of the termination state.

S406: Output a service execution result of the resource data transfer service according to the execution result of the second service logic when the second state is a termination state. A service logic of the resource data transfer service includes at least the first service logic and the second service logic.

During specific implementation, the execution result of the second service logic may include notification information indicating that all resource data packets have been accepted or an expired resource data packet has been returned to an account. Specifically, when the execution result of the second service logic is the notification information indicating that all of the resource data packets have been accepted, the service execution result of the resource transfer-out service is successful transfer-out of the resource data packets. When the execution result of the second service logic is that the expired resource data packet has been returned to the account, the service execution result of the resource transfer-out service is successful transfer-out of partial resource data packets.

In this embodiment of this application, during the implementation of the resource data transfer service, the state determination condition corresponding to the first state may be determined by using the plurality of state determination conditions corresponding to the state machine, and the first service logic is determined according to the state determination condition corresponding to the first state, and then the state machine is adjusted to the second state according to the execution result of the first service logic. In this way, the implementation of the resource data transfer service is enriched. Further, using the state machine in the above process can help orderly perform the state transition of the entire resource data transfer service, thereby facilitating maintenance. In this way, the resource data transfer service can be implemented more effectively.

Figure 5:
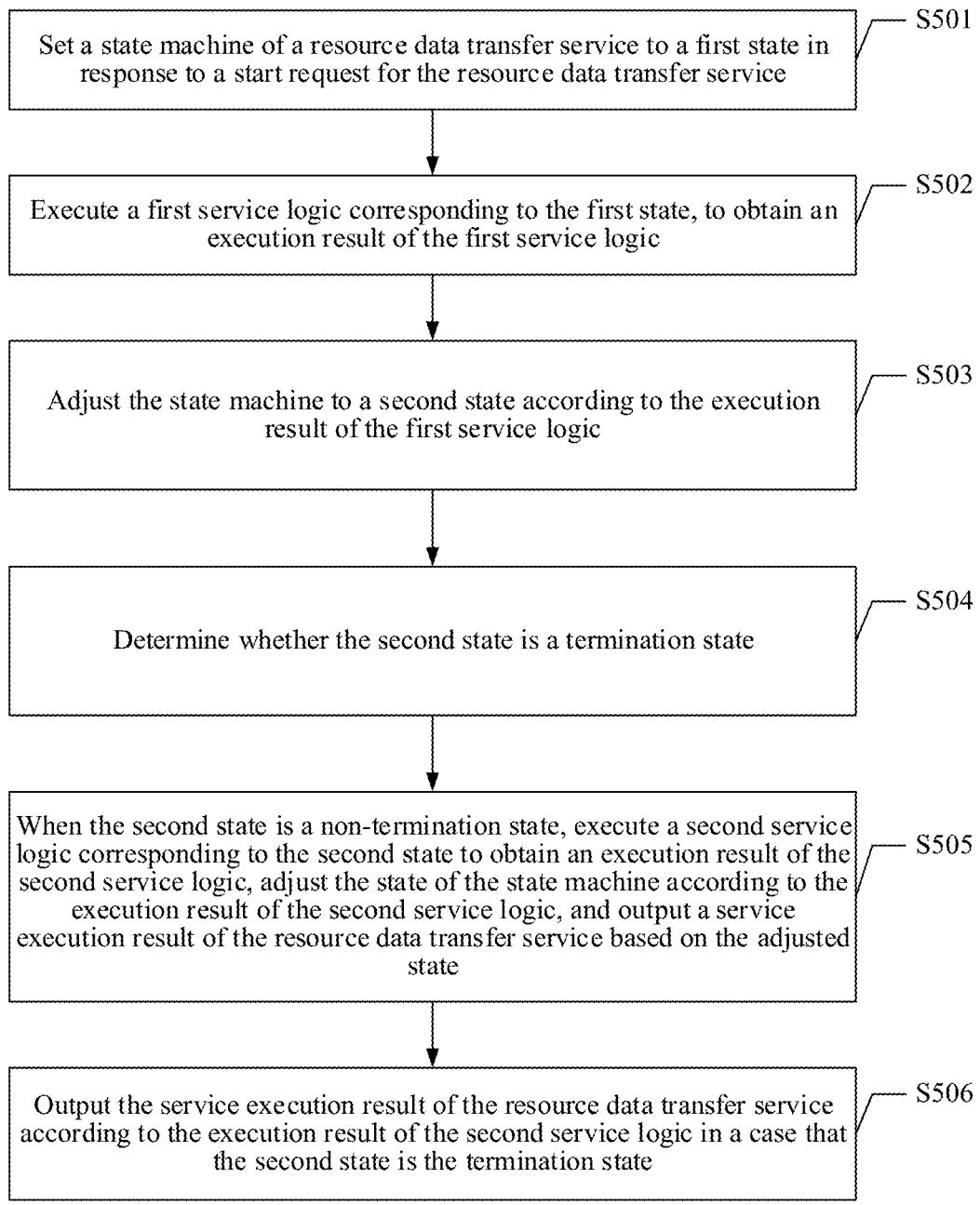
FIG. 5 is a schematic flowchart of a data processing method according to an embodiment of this application.

FIG. 5 is a schematic flowchart of a data processing method according to an embodiment of this application. The method may be performed by a computer device. The computer device configures corresponding state machines for different services. This embodiment is described by using an example in which the resource data transfer service is a resource transfer-in service. The resource transfer-in service may be a cross-regional resource transfer-in service, or a same-region resource transfer-in service. This is not limited in this embodiment of this application. The data processing method may include the following steps S501-S506:

S501: Set a state machine of a resource data transfer service to a first state in response to a start request for the resource data transfer service.

The start request carries a state identifier of the first state.

S502: Execute a first service logic corresponding to the first state, to obtain an execution result of the first service logic.

The state machine includes a plurality of states, each of the state corresponding to an object-oriented state class, each state class including a service logic, and a state pointer pointing to an instance corresponding to the state class of the first state when the state machine is in the first state. Specifically, the to-be-executed service logic of the first state is encapsulated in the instance corresponding to the state class of the first state. Since the state pointer points to the instance corresponding to the state class of the first state, the computer device may correspondingly determine the first service logic corresponding to the first state, and execute the first service logic.

In an embodiment, a state pattern may include a context class and an abstract class in addition to the state class, the context class maintains instances of a state class and executes operations of instances corresponding to the state class through an interface of the abstract class. The context class may have a state pointer. The abstract class is defined as an abstract interface of the context class, which may be understood as a base class. The abstract class is a parent class of the state class. Specifically, the computer device may cause a state pointer of the context class point to the instance of the state class of the first state in the abstract class.

Figure 6A:
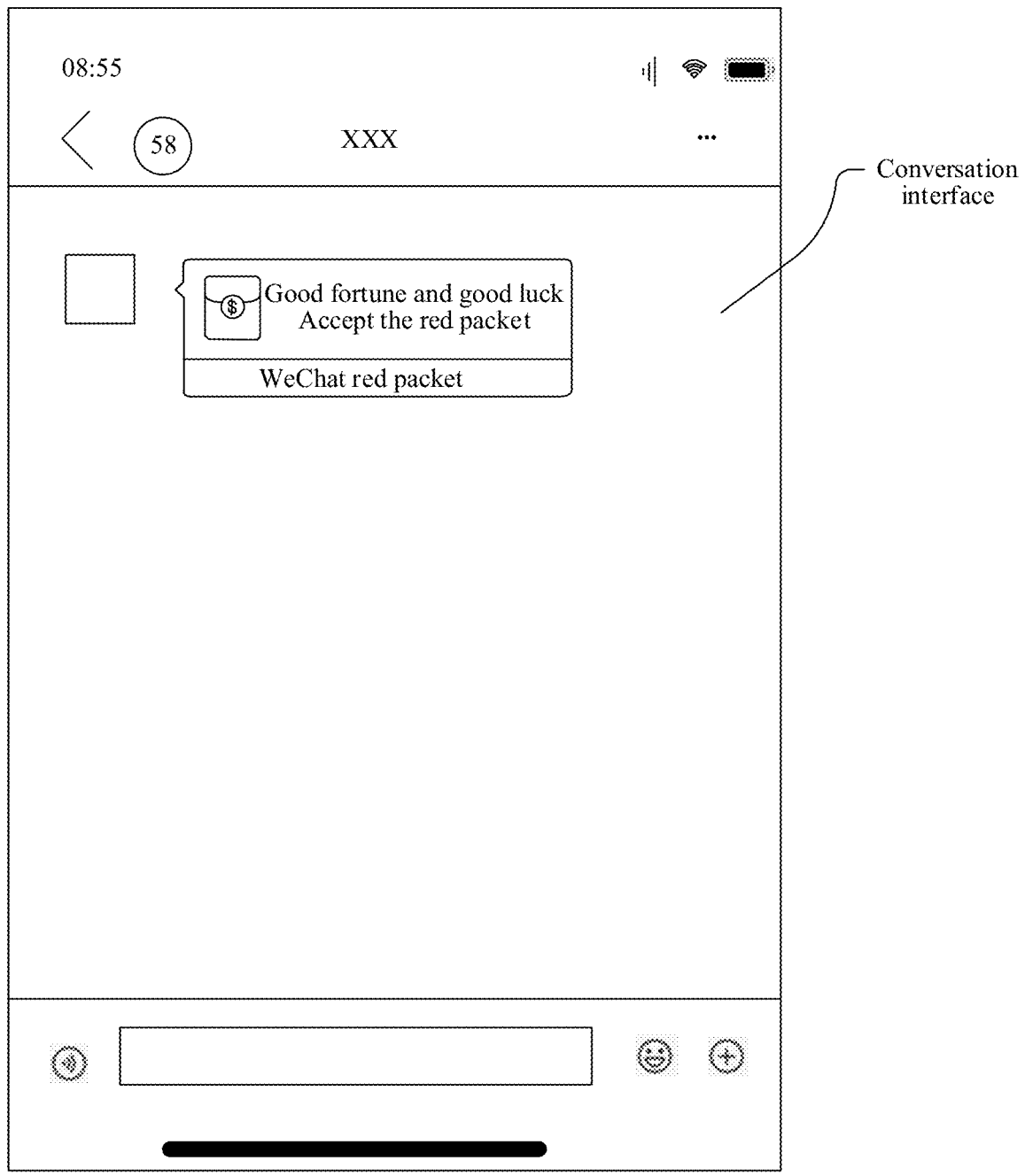
FIG. 6a is a schematic diagram of a notification message displaying a red packet according to an embodiment of this application.

In an embodiment, the first service logic includes displaying, on a conversation interface, a notification message indicating that a resource data packet is accepted. For example, the cross-regional resource transfer-in service is cross-regional red packet acceptance. When a notification message indicating that a red packet is accepted is displayed on the conversation interface during execution of the first service logic by the computer device, the notification message indicating that the red packet is accepted is displayed on the conversation interface, as shown in FIG. 6a.

S503: Adjust the state machine to a second state according to the execution result of the first service logic.

During specific implementation, since a state transition logic may be integrated with a state object based on the state pattern instead of a huge conditional statement, the state classes described above each include a state transfer logic. The computer device may determine the second state according to the first service logic and the state transition logic, and then cause the state pointer to point to the instance corresponding to the state class of the second state, so that the state machine is adjusted from the first state to the second state.

In an embodiment, the state transition logic includes one or more transition conditions and states corresponding to the transition conditions. A specific implementation of determining the second state according to the first service logic and the state transition logic by the computer device includes: determining whether the execution result of the first service logic hits a target transition condition in the state transition logic; and determining a state corresponding to the target transition condition as the second state if the execution result of the first service logic hits the target transition condition in the state transition logic, the target transition condition being one of the one or more transition conditions.

During specific implementation, for example, the resource data transfer service is a resource transfer-in service, and the plurality of transition conditions include failed resource payment and successful resource payment, the failed resource payment corresponding to a state of resource transfer-in failed, and the successful resource payment corresponding to a state of resource transfer-in succeeded. If the target transition condition hit by the execution result of the first service logic is the failed resource payment, the state of resource transfer-in failed may be determined as the second state. If the target transition condition hit by the execution result of the first service logic is the successful resource payment, the state of resource transfer-in succeeded may be used as the second state.

The above each state corresponds to a process-oriented state class, and each state class includes a service logic and a state transition condition, which may be stored in a blockchain network.

For example, when the resource transfer-in service is a red packet accepting service, two transition conditions may include successful resource data transfer and failed resource data transfer. The successful resource data transfer corresponds to a state of enterprise payment succeeded, and the failed resource data transfer corresponds to a state of enterprise payment failed. If the execution result of the first service logic hits the successful resource data transfer in the two transition conditions, the state of enterprise payment succeeded is used as the second state. If the execution result of the first service logic hits the failed resource data transfer in the two transition conditions, the state of enterprise payment failed is used as the second state.

S504: Determine whether the second state is a termination state.

During specific implementation, the computer device may call a target function in the state class corresponding to the abstract class through the context class for determination of the termination state. If the target function returns a state identifier of a termination state, it is determined that the second state is the termination state, and step S506 is performed. If the target function returns a state identifier of a non-termination state, it is determined that the second state is the non-termination state, and step S505 is performed.

S505: When the second state is a non-termination state, execute a second service logic corresponding to the second state to obtain an execution result of the second service logic, adjust the state of the state machine according to the execution result of the second service logic, and output a service execution result of the resource data transfer service based on the adjusted state.

Figure 6B:
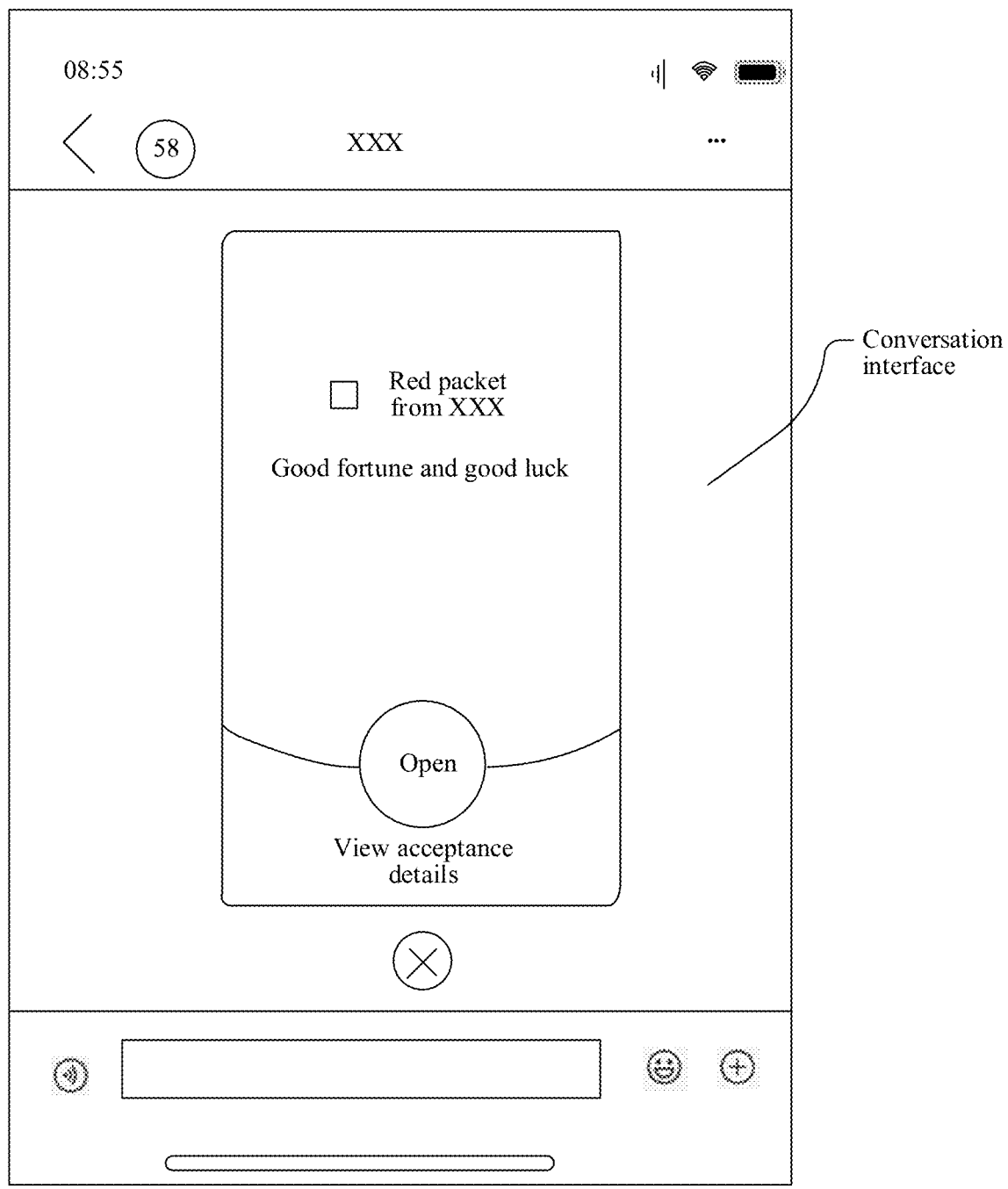
FIG. 6b is a schematic diagram of a notification message displaying a red packet according to an embodiment of this application.

During specific implementation, when the second state is the non-termination state, the computer device may call a service execution function to execute the second service logic corresponding to the second state. The second service logic may include displaying a red packet opening window on the conversation interface. The interface with the red packet opening window being displayed may be shown in FIG. 6b.

S506: Output the service execution result of the resource data transfer service according to the execution result of the second service logic when the second state is the termination state.

A service logic of the resource data transfer service includes at least the first service logic and the second service logic.

Figure 6C:
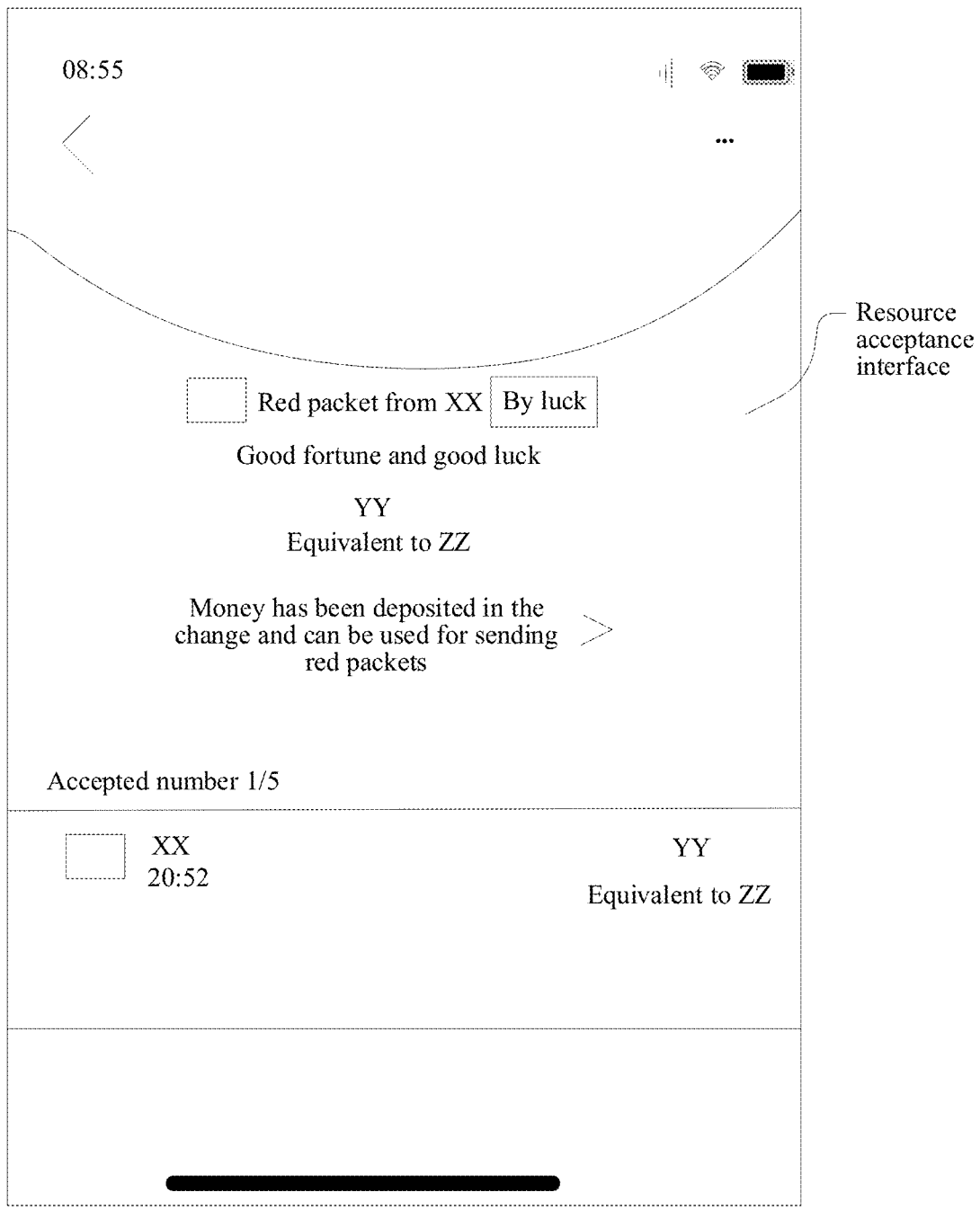
FIG. 6c is a schematic diagram of displaying data on a resource acceptance interface according to an embodiment of this application.

In an embodiment, the second service logic includes displaying, on a resource acceptance interface, a user name of a user initiating the resource transfer-in service, a first resource data amount, and a second resource data amount, the first resource data amount and the second resource data amount corresponding to resource types in different regions. For example, it is assumed that a region corresponding to the first resource data amount is a region 2, a resource type of the first resource data amount is a resource data 2 (that is, resource data applicable to the region 2), a region corresponding to the second resource data amount is a region 1, and a resource type corresponding to the second resource data amount is a resource data 1 (that is, resource data applicable to the region 1). As shown in FIG. 6c, after the first service logic is executed, the computer device adjusts the state machine to the second state, and executes the second service logic corresponding to the second state, that is, displays, on the resource acceptance interface, a name "XX" of a user sending the red packet, the first resource data amount "YY", and the second resource data amount "ZZ". For another example, the region corresponding to the first resource data amount is a region 2, the resource type of the first resource data amount is a resource data 1, the region corresponding to the second resource data amount is a game application region, and the resource type of the second resource data amount is a game currency. The resource types in the different regions corresponding to the first resource data amount and the second resource data amount are not limited in this application.

In this embodiment of this application, during the execution of the resource data transfer service, the computer device adjusts the state machine of the resource data transfer service from the first state to the second state according to the execution result of the first service logic of the first state, and determines the termination state in each state. In this way, the implementation of the resource data transfer service is enriched. Further, using the state machine in the above process can help orderly perform the state transition of the entire resource data transfer service, thereby facilitating maintenance. In this way, the resource data transfer service can be implemented more effectively. Moreover, since the state corresponds to a process-oriented state class, when the state machine has many states, the processing time of the entire resource data transfer service can be reduced. Further, since the state corresponds to a state class, if all behaviors related to a state are configured in the corresponding state class, a behavior of an object may be changed merely by changing a state of the object. Based on this, when a new state is required to be added to the resource data transfer service, only a new state class corresponding to the new state is required to be generated for performing a corresponding operation, which has desirable extendability.

Figure 7:
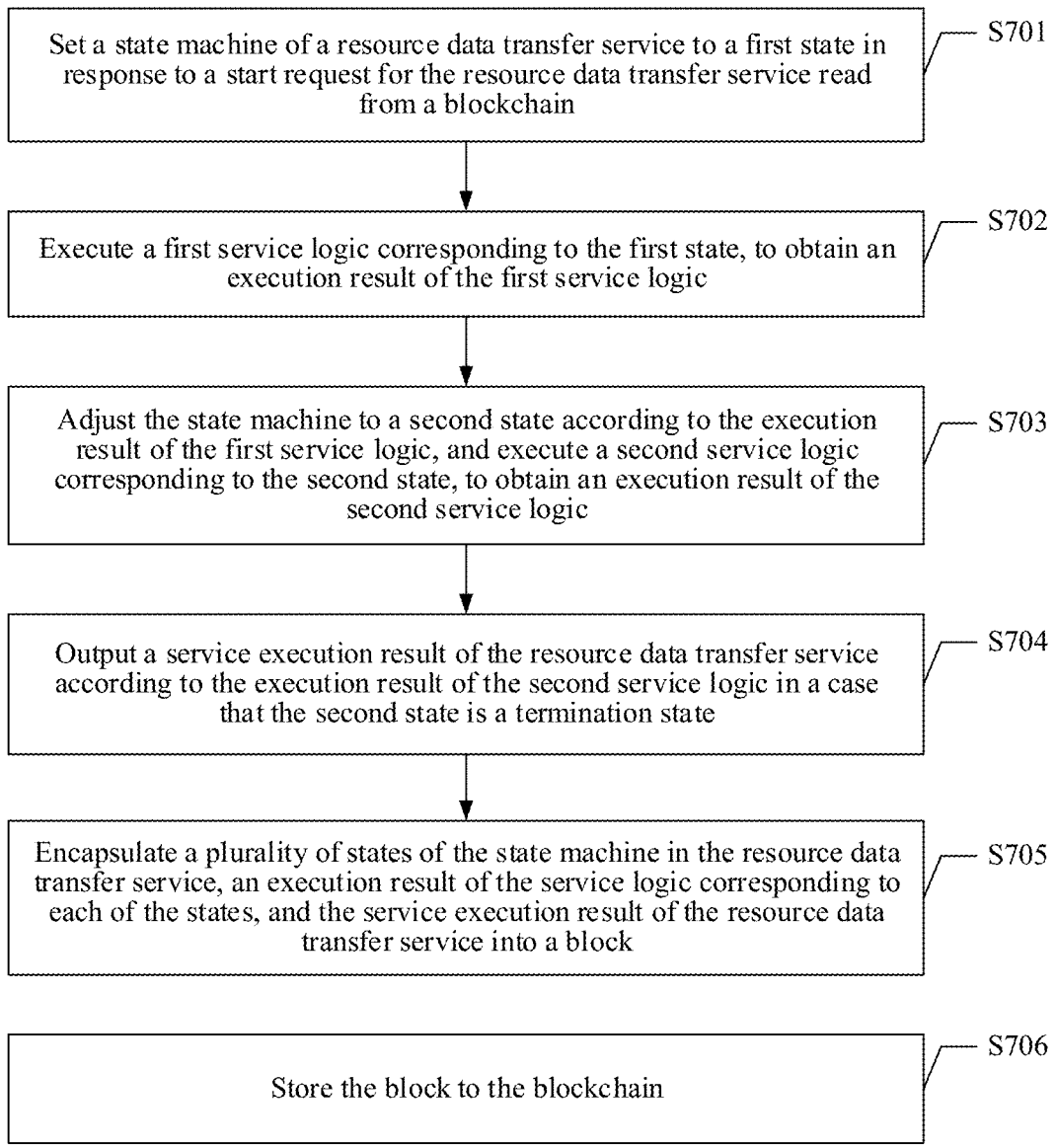
FIG. 7 is a schematic flowchart of a data processing method according to an embodiment of this application.

FIG. 7 is a schematic flowchart of a data processing method according to an embodiment of this application. The data processing method may be performed by any node in a blockchain network, that is, the computer device in the above embodiments may be any node, and corresponding state machines are configured for different services. The data processing method in this embodiment may include the following steps S701-S706:

S701: Set a state machine of a resource data transfer service to a first state in response to a start request for the resource data transfer service read from a blockchain.

During specific implementation, any node can read the start request for the resource data transfer service, and set the state machine of the resource data transfer service to the first state according to the start request.

S702: Execute a first service logic corresponding to the first state, to obtain an execution result of the first service logic.

S703: Adjust the state machine to a second state according to the execution result of the first service logic, and execute a second service logic corresponding to the second state, to obtain an execution result of the second service logic.

S704: Output a service execution result of the resource data transfer service according to the execution result of the second service logic when the second state is a termination state. A service logic of the resource data transfer service includes at least the first service logic and the second service logic.

For specific implementations of steps S702-S704, refer to the specific implementations of steps S302-S304, which are not repeated herein.

S705: Encapsulate a plurality of states of the state machine in the resource data transfer service, an execution result of the service logic corresponding to each of the states, and the service execution result of the resource data transfer service into a block.

During specific implementation, after receiving the plurality of states of the state machine in the resource data transfer service, the execution result of the service logic corresponding to the state, and the service execution result of the resource data transfer service, any node may verify the received plurality of states, the execution result of the service logic corresponding to the state, and the service execution result of the resource data transfer service. After the verification succeeds, any node may store the plurality of states, the execution result of the service logic corresponding to the state, and the service execution result of the resource data transfer service, and generate a block header and a block body to obtain the block.

S706: Store the block to the blockchain.

During specific implementation, any node sends the generated block to other nodes in the blockchain network, and the other nodes verify the generated block, and add the block to the blockchain after the verification succeeds.

In this embodiment of this application, during the execution of the resource data transfer service, the state machine is used to control the transfer of the resource data in the resource data transfer service, so that some processes do not need to be executed according to a preset logic, and the state transition process of the resource data transfer service can be accurately determined, thereby completing the resource data transfer service. Since the plurality of states of the state machine during the resource data transfer service, the execution result of the service logic corresponding to the state, and the service execution result of the resource data transfer service are stored in the blockchain, the plurality of states of the state machine during the resource data transfer service, the execution result of the service logic corresponding to the state, and the service execution result of the resource data transfer service can be effectively prevented from being tempered with.

Figure 8A:
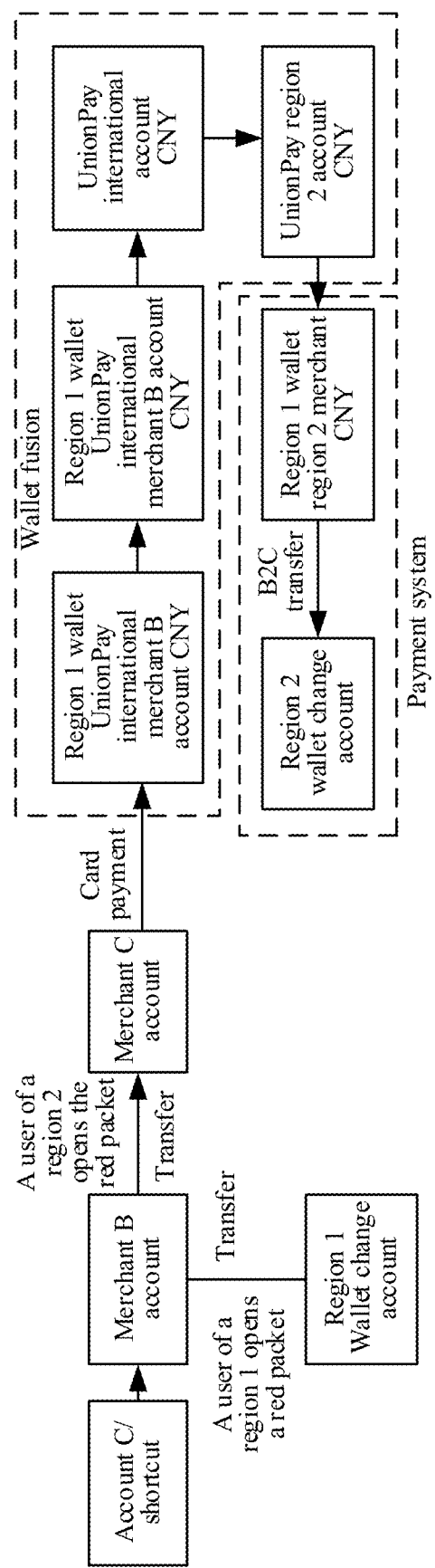
FIG. 8a is a schematic diagram of a fund flowing direction flow of a red packet according to an embodiment of this application.

Based on the above data processing method, an embodiment of this application further provides a more detailed solution for implementing a resource transfer-in service based on a state machine. For ease of understanding, the resource transfer-in service is a cross-regional red packet accepting service. FIG. 8a shows a specific circulation process of an entire red packet fund flow. A user C in a region 1 sends a red packet through an account C or a shortcut. The account C may be understood as a wallet of the user C, and the shortcut may be understood as a bank card. The computer device stores data resources in the sent red packet to an intermediate account (a merchant B account in FIG. 8a), and then waits for the user to accept the red packet. When a user in the region 1 accepts the red packet, the resource data in the red packet is directly transferred to a wallet of the user through the intermediate account. However, when a user in a region 2 accepts the red packet, the resource data in the red packet is required to be transferred to another intermediate account (a merchant C account in FIG. 8a) through the intermediate account. Then card payment is required to be performed through the merchant C account to fuse the resource data through a wallet and thereby realize conversion between resource data 1 (resource data applicable to the region 1) to resource data 2 (resource data applicable to the region 2), and finally the resource data arrives at a wallet of the user in the region 2. Since the wallet fusion process is fixed, states during the wallet fusion are not discussed in this embodiment of this application. It can be learned from FIG. 8a that after the user in the region 2 accepts the red packet, a plurality of state changes will occur. Therefore, the cross-border red packet acceptance may be implemented based on a state pattern. The state pattern is mainly composed of three classes: a Context class, a State class (or referred to as an abstract class) and a ConcreteState class (or referred to as a state class). Each of the states corresponds to a state of a cross-regional red packet state machine, and internal encapsulation of the state corresponds to an implementation required for the state.

Figure 8B:
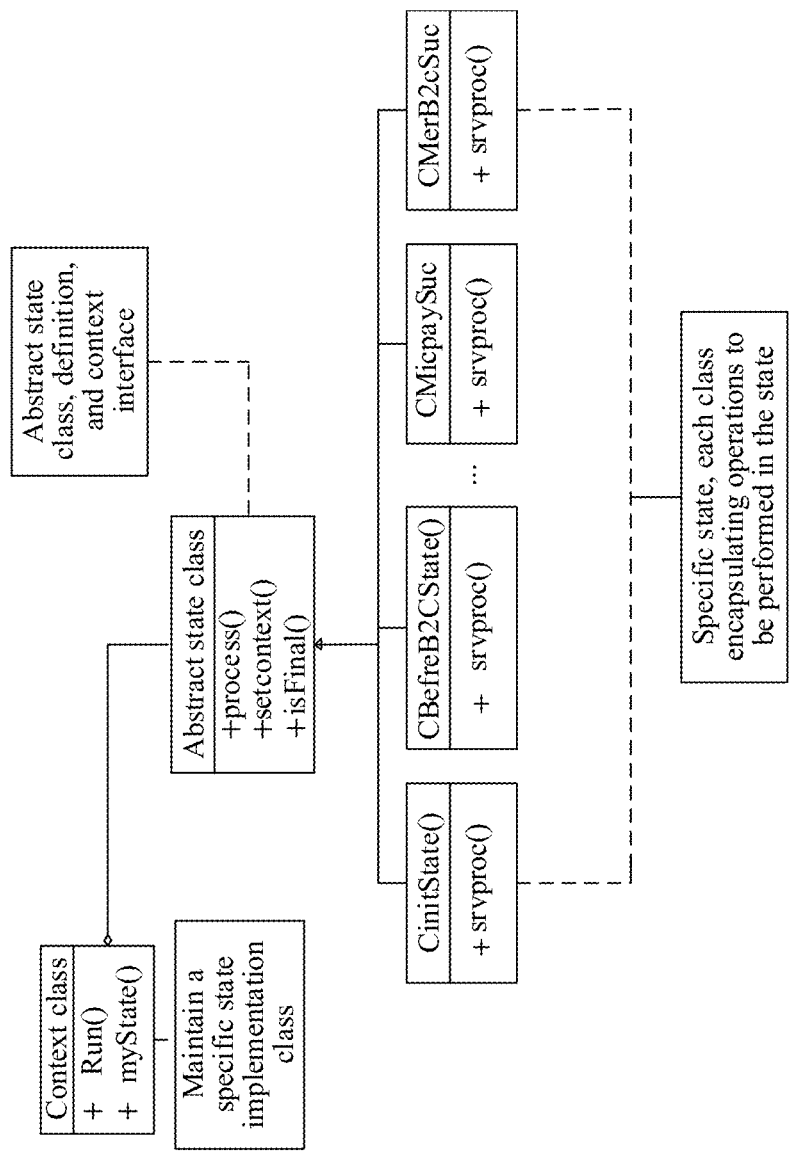
FIG. 8b is a schematic diagram of implementation of a state machine based on a state pattern according to an embodiment of this application.

The implementation of the cross-regional red packet based on the state pattern may be shown in FIG. 8b: The Context class has a state pointer (a parent pointer of the ConcreteState class) that points to the State class. The Context class may include a Run function and a mystate function. The Run function may be used to realize state transition of the state machine through the state pointer and execute a service logic corresponding to the state. The mystate function may be used to implement other functions. Each ConcreteState class corresponds to an isFinal function, a process function, a setcontext function, and the like. The isFinal function may be used to determine a termination state of the state machine, the process function may be used to execute the service logic corresponding to the state of the state machine, and the setcontext function may be used to implement other functions of the state machine. When receiving a start request for the red packet service from the user in the region 2, the computer device sets the state machine of the cross-regional red packet service to an initial state (corresponding to the above first state), and calls, through the Run function in the Context class, the state pointer to point to the isFinal function in the State class corresponding to the initial state in the State class, to determine whether the first state is a termination state.

(1) If the computer device determines that the initial state is a non-termination state, the state pointer is called through the Run function in the Context class to point to the process function in the state class corresponding to the initial state in the State class, and then resource data 1 (corresponding to the above first resource data amount) is calculated, and the resource data 1 is converted to corresponding resource data 2 (corresponding to the above second resource data amount), and an entry is inserted into the sub-bill table, and then the pointer in the Context class pointing to the State class is updated so that the pointer points to an instance of CBeforeB2CState.

(2) After updating the pointer in the Context class pointing to the State class so that the pointer points to the instance of CBeforeB2CState, the computer device needs to determine whether a state corresponding to the CBeforeB2CState class is a termination state according to the above implementation of determining whether the initial state is a termination state. If the state corresponding to the CBeforeB2CState class is a non-termination state, a service logic corresponding to the CBeforeB2CState class may be executed according to the service logic corresponding to the initial state, that is, transfer is performed from the merchant B account to the merchant C account. If the transfer succeeds (a service logic execution result), the State pointer in the Context class is updated so that the pointer points to an instance of CB2CSucState (the state pointer points to the instance of CB2CSucState).

(3) After the State pointer in the Context class is updated so that the pointer points to the instance of CB2CSucState (the state pointer points to the instance of CB2CSucState), CB2CSucState is processed according to the above processing process of the initial state, and then a service logic corresponding to CB2CSucState is executed, that is, card payment is executed. When the card payment succeeds, the State pointer in the Context class is updated to a next state. Similar operations are repeated.

It may be learned from the above process of implementing cross-regional red packet receipt based on the state machine, the state forms a subclass, and each state class only relates to a next possible state (that is, a transition principle is encapsulated). The state classes need to be determined before possible states are enumerated. If a new state is required to be added to the state machine, only a service logic corresponding to the newly-added state is required to be implemented in the ConcreteState class corresponding to the newly-added state. Then a service logic and a state transition condition in a state class corresponding to a previous state are modified, so that the previous state points to the newly added state. In this way, the entire process can be automatically executed according to the state machine, which does not require to reconstruct the entire service logic, and is not invasive to the original logic, has desirable extendability, and is suitable for the code implementation of state machines in industries such as payment.

To sum up, the implementation of the state transition of the resource data transfer service based on the state pattern in the embodiments of this application has the following advantages:

(1) The each state forms a subclass, and each state class only relates about a next possible state, and therefore the transition principle is encapsulated.
(2) All possible states of the resource data transfer service are enumerated, and the state classes are determined before the states are enumerated.
(3) All behaviors related to a state are grouped into a class, and when a new state is subsequently added, only a relevant behavior of a previous state needs to be changed, so that new states can be conveniently added. In addition, a behavior of an object can be adjusted merely by adjusting an object state.
(4) The state transition logic is allowed to be integrated with a state object, that is, the state transition logic and the state object are both stored in a class corresponding to the state object, instead of a huge conditional statement block.
(5) A plurality of context objects can share one state object, which reduces a number of objects in the system.

That is to say, by virtue of the advantages, the code implementation of the source data transfer service is finally presented as a design implementation with high cohesion and high extendability.

Figure 9:
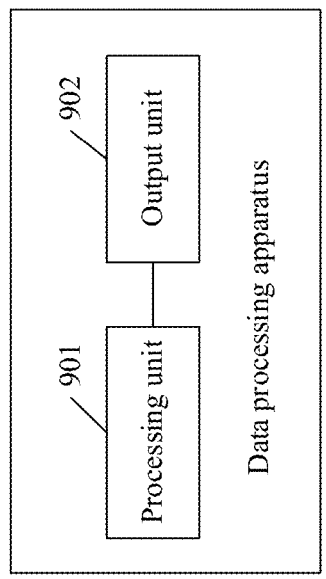
FIG. 9 is a schematic structural diagram of a data processing apparatus according to an embodiment of this application.

FIG. 9 is a schematic structural diagram of a data processing apparatus according to an embodiment of this application. As shown in FIG. 9, the data processing apparatus is applicable to the computer device in the corresponding embodiment of FIG. 3, FIG. 4, or FIG. 5. Alternatively, the data processing apparatus is applicable to any node in the corresponding embodiment of FIG. 7. Specifically, the data processing apparatus may be a computer program (including program code) running in a computer device. For example, the data processing apparatus is application software. The data processing apparatus may be configured to perform the corresponding steps in the method provided in the embodiments of this application.

A processing unit 901 is configured to set a state machine of a resource data transfer service to a first state in response to a start request for the resource data transfer service, the start request carrying a state identifier of the first state.

The processing unit 901 is further configured to execute a first service logic corresponding to the first state, to obtain an execution result of the first service logic.

The processing unit 901 is further configured to adjust the state machine to a second state according to the execution result of the first service logic, and execute a second service logic corresponding to the second state, to obtain an execution result of the second service logic.

An output unit 902 is configured to output a service execution result of the resource data transfer service according to the execution result of the second service logic when the second state is a termination state, a service logic of the resource data transfer service including at least the first service logic and the second service logic.

In an embodiment, the processing unit 901 is further configured to:
determine whether the second state is a termination state; and
adjust the state of the state machine according to the execution result of the second service logic when the second state is a non-termination state, and output the service execution result of the resource data transfer service based on the adjusted state.

In an embodiment, the resource data transfer service includes a cross-regional resource transfer-in service, the first service logic includes displaying, on a conversation interface, a notification message indicating that a resource data packet is received, and the second service logic includes displaying, on a resource acceptance interface, a user name of a user initiating the resource transfer-in service, a first resource data amount, and a second resource data amount, the first resource data amount and the second resource data amount corresponding to resource types in different regions.

In an embodiment, the start request for the resource data transfer service is a request generated in response to a resource data transfer operation; or
the start request for the resource data transfer service is a breakpoint restart request generated in response to failed state adjustment of the state machine, and the state identifier of the first state carried in the start request is a state identifier of a state of the state machine in response to the failed state adjustment.

In an embodiment, the state machine corresponds to a plurality of states, each of the states corresponding to a process-oriented state determination condition, each state determination condition corresponding to a service logic, and the plurality of states including at least the first state and the second state. The processing unit 901 is further configured to:
traverse the state determination conditions corresponding to the plurality of states to determine the state determination condition corresponding to the first state; and
read the service logic corresponding to the state determination condition of the first state as the first service logic.

In an embodiment, the resource data transfer service includes a resource transfer-out service, and the execution result of the first service logic includes a number of transferred resource data packets and a valid timestamp of the resource data packets. The processing unit 901 is further configured to:
acquire a total number of resource data packets;
adjust the state machine to an all resources transferred out state as the second state of the state machine when the number of transferred resource data packets is equal to the total number of resource data packets; and
adjust the state machine to a resource returning state as the second state of the state machine when the number of transferred resource data packets is less than the total number of resource data packets and the valid timestamp of the resource data packets exceeds a preset timestamp.

In an embodiment, the state machine includes a plurality of states, each of the states corresponding to an object-oriented state class, each state class including a service logic, and a state pointer pointing to an instance corresponding to the state class of the first state when the state machine is in the first state. The processing unit 901 is further configured to:
determine a state transition logic of the first state;
determine the second state according to the execution result of the first service logic and the state transition logic; and
cause the state pointer to point to an instance corresponding to the state class of the second state, so that the state machine is adjusted from the first state to the second state.

In an embodiment, the state transition logic includes one or more transition conditions and states corresponding to the transition conditions. The processing unit 901 is further configured to:

determine the state corresponding to a target transition condition as the second state when the execution result of the first service logic hits the target transition condition in the state transition logic, the target transition condition being one of the one or more transition conditions.

In an embodiment, the resource data transfer service includes a resource transfer-in service, and the plurality of transition conditions include failed resource payment and successful resource payment, the failed resource payment corresponding to a state of resource transfer-in failed, and the successful resource payment corresponding to a state of resource transfer-in succeeded;

when the target transition condition is the failed resource payment, the second state is the state of resource transfer-in failed; and when the target transition condition is the successful resource payment, the second state is the state of resource transfer-in succeeded.

In an embodiment, the state of the state machine corresponds to a process-oriented state determination condition; or the state of the state machine corresponds to an object-oriented state class, and the state class depends on a state number corresponding to the state machine.

In an embodiment, the start request for the resource data transfer service is read from a blockchain. The processing unit 901 is further configured to:

encapsulate a plurality of states of the state machine in the resource data transfer service, an execution result of the service logic corresponding to each of the states, and the service execution result of the resource data transfer service into a block; and store the block to the blockchain.

It may be understood that the functions of each functional unit of the data processing apparatus in this embodiment may be specifically implemented according to the methods in the above method embodiments. For a specific implementation process, refer to the related description in FIG. 3, FIG. 4, FIG. 5, or FIG. 7 of the above method embodiments, and the details are not repeated herein.

Figure 10:
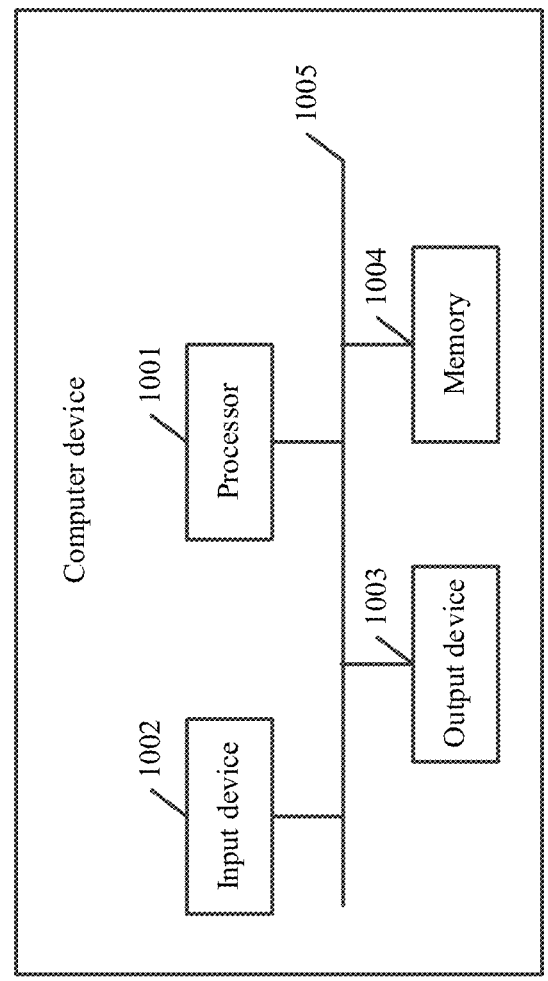
FIG. 10 is a schematic structural diagram of a computer device according to an embodiment of this application.

Further, FIG. 10 is a schematic structural diagram of a computer device according to an embodiment of this application. The computer device in the embodiment corresponding to FIG. 3, FIG. 4, or FIG. 5 may be the computer device shown in FIG. 10, and any node in the embodiment corresponding to FIG. 7 may be the computer device shown in FIG. 10. As shown in FIG. 10, the computer device may include: a processor 1001, an input device 1002, an output device 1003, and a memory 1004. The processor 1001, the input device 1002, the output device 1003, and the memory 1004 are connected through a bus 1005. The memory 1004 is configured to store a computer program, and the computer program includes program instructions. The processor 1001 is configured to execute the program instructions stored in the memory 1004.

In this embodiment of this application, the processor 1001 performs the data processing method described in the foregoing method embodiments by running an executable program code in the memory 1004:

It should be understood that in this embodiment of this application, the processor 1001 may be a central processing unit (CPU), or the processor 1001 may be another general-purpose processor, a digital signal processor (DSP), an application specific integrated circuit (ASIC), a field-programmable gate array (FPGA), or another programmable logic device, discrete gate or transistor logic device, discrete hardware component, or the like. The general-purpose processor may be a microprocessor, or the processor may be any conventional processor or the like.

The memory 1004 may include a read-only memory and a random access memory, and provides the processor 1001 with data and instructions. A part of the memory 1004 may further include a non-volatile random access memory.

The input device 1002 may include a keyboard and the like, and input source code of a to-be-tested blockchain program to the processor 1001. The output device 1003 may include a display and the like.

During specific implementation, the processor 1001, the input device 1002, the output device 1003, and the memory 1004 described in this embodiment of this application may perform the implementations described in all of the above embodiments, and may perform the implementations described in the above apparatus. The details are not repeated herein.

The embodiments of this application provide a non-transitory computer-readable storage medium, storing a computer program. The computer program includes program instructions, and the program instructions, when executed by a processor of a computer device, causes the computer device to perform steps executed in all the embodiments.

The embodiments of this application further provide a computer program product or a computer program. The computer program product or the computer program includes computer instructions. The computer instructions are stored in a non-transitory computer-readable storage medium, and when executed by a processor of a computer device, perform the methods in all the embodiments.

A person of ordinary skill in the art may understand that all or some of the processes of the methods in the embodiments may be implemented by a computer program instructing relevant hardware. The program may be stored in a non-transitory computer-readable storage medium. When the program is executed, the processes of the methods in the embodiments may be performed. The storage medium may be a magnetic disk, an optical disc, a read-only memory (ROM), a random access memory (RAM), or the like.

The contents disclosed above are merely exemplary embodiments of the present disclosure, and certainly are not intended to limit the protection scope of the present disclosure. A person of ordinary skill in the art may understand all or some of processes that implement the foregoing embodiments, and equivalent modifications made according to the claims of the present disclosure shall still fall within the scope of the present disclosure. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A data processing method, performed by a computer device, the method comprising:

setting a state machine of a resource data transfer service to a first state in response to a start request for the resource data transfer service, the start request carrying a state identifier of the first state and the resource data transfer service comprises a cross-regional resource transfer-in service;

executing a first service logic corresponding to the first state, to obtain an execution result of the first service logic, the first service logic comprises displaying, on a conversation interface, a notification message indicating that a resource data packet is received;

adjusting the state machine to a second state according to the execution result of the first service logic, and executing a second service logic corresponding to the second state to obtain an execution result of the second service logic, the second service logic including displaying, on a resource acceptance interface, a user name of a user initiating the cross-regional resource transfer-in service, a first resource data amount and a second resource data amount, the first resource data amount and the second resource data amount corresponding to resource types in different regions; and outputting a service execution result of the resource data transfer service according to the execution result of the second service logic when the second state is a termination state, a service logic of the resource data transfer service comprising at least the first service logic and the second service logic.

2. The method according to claim 1, further comprising: adjusting the state machine according to the execution result of the second service logic when the second state is a non-termination state, and outputting the service execution result of the resource data transfer service based on the adjusted state.

3. The method according to claim 1, wherein the start request for the resource data transfer service is a request generated in response to a resource data transfer operation; or the start request for the resource data transfer service is a breakpoint restart request generated in response to failed state adjustment of the state machine, and the state identifier of the first state carried in the start request is a state identifier of a state of the state machine in response to the failed state adjustment.

4. The method according to claim 1, wherein the state machine corresponds to a plurality of states, each of the plurality of states corresponding to a process-oriented state determination condition, each state determination condition corresponding to a service logic, and the plurality of states comprising at least the first state and the second state; and
the method further comprises:
traversing the state determination conditions corresponding to the plurality of states to determine the state determination condition corresponding to the first state; and
reading the service logic corresponding to the state determination condition of the first state as the first service logic.

5. The method according to claim 1, wherein the state machine comprises a plurality of states, each of the plurality of states corresponding to an object-oriented state class, each state class comprising a service logic, and a state pointer pointing to an instance corresponding to the state class of the first state when the state machine is in the first state; and
the adjusting the state machine to a second state according to the execution result of the first service logic comprises:

determining a state transition logic of the first state;
determining the second state according to the execution result of the first service logic and the state transition logic; and
causing the state pointer to point to an instance corresponding to the state class of the second state, so that the state machine is adjusted from the first state to the second state.

6. The method according to claim 1, wherein the state machine corresponds to a process-oriented state determination condition; or
the state machine corresponds to an object-oriented state class, and the state class depends on a state number corresponding to the state machine.

7. The method according to claim 1, wherein the start request for the resource data transfer service is read from a blockchain; and
the method further comprises:
encapsulating a plurality of states of the state machine in the resource data transfer service, an execution result of the service logic corresponding to each of the states, and the service execution result of the resource data transfer service into a block; and
storing the block to the blockchain.

8. A computer device, comprising an input device and an output device, a processor and a storage medium, the processor being configured to execute one or more instructions stored in the storage medium to perform a data processing method including:
setting a state machine of a resource data transfer service to a first state in response to a start request for the resource data transfer service, the start request carrying a state identifier of the first state and the resource data transfer service comprises a cross-regional resource transfer-in service;
executing a first service logic corresponding to the first state, to obtain an execution result of the first service logic, the first service logic comprises displaying, on a conversation interface, a notification message indicating that a resource data packet is received;
adjusting the state machine to a second state according to the execution result of the first service logic, and executing a second service logic corresponding to the second state to obtain an execution result of the second service logic, the second service logic including displaying, on a resource acceptance interface, a user name of a user initiating the cross-regional resource transfer-in service, a first resource data amount and a second resource data amount, the first resource data amount and the second resource data amount corresponding to resource types in different regions; and
outputting a service execution result of the resource data transfer service according to the execution result of the second service logic when the second state is a termination state, a service logic of the resource data transfer service comprising at least the first service logic and the second service logic.

9. The computer device according to claim 8, wherein the method further comprises:
adjusting the state of the state machine according to the execution result of the second service logic when the second state is a non-termination state, and outputting the service execution result of the resource data transfer service based on the adjusted state.

10. The computer device according to claim 8, wherein the start request for the resource data transfer service is a request generated in response to a resource data transfer operation; or the start request for the resource data transfer service is a breakpoint restart request generated in response to failed state adjustment of the state machine, and the state identifier of the first state carried in the start request is a state identifier of a state of the state machine in response to the failed state adjustment.

11. The computer device according to claim 8, wherein the state machine corresponds to a plurality of states, each state of the plurality of states corresponding to a process-oriented state determination condition, each state determination condition corresponding to a service logic, and the plurality of states comprising at least the first state and the second state; and the method further comprises:
traversing the state determination conditions corresponding to the plurality of states to determine the state determination condition corresponding to the first state; and
reading the service logic corresponding to the state determination condition of the first state as the first service logic.

12. The computer device according to claim 9, wherein the state machine comprises a plurality of states, each state of the plurality of states corresponding to an object-oriented state class, each state class comprising a service logic, and a state pointer pointing to an instance corresponding to the state class of the first state when the state machine is in the first state; and the adjusting the state machine to a second state according to the execution result of the first service logic comprises:
determining a state transition logic of the first state;
determining the second state according to the execution result of the first service logic and the state transition logic; and
causing the state pointer to point to an instance corresponding to the state class of the second state, so that the state machine is adjusted from the first state to the second state.

13. The computer device according to claim 9, wherein the state machine corresponds to a process-oriented state determination condition; or the state machine corresponds to an object-oriented state class, and the state class depends on a state number corresponding to the state machine.

14. The computer device according to claim 8, wherein the start request for the resource data transfer service is read from a blockchain; and the method further comprises:
encapsulating a plurality of states of the state machine in the resource data transfer service, an execution result of the service logic corresponding to each of the states, and the service execution result of the resource data transfer service into a block; and
storing the block to the blockchain.

15. A non-transitory computer storage medium, storing program instructions, and the program instructions, when executed by a processor of a computer device, cause the computer device to perform a data processing method including:

setting a state machine of a resource data transfer service to a first state in response to a start request for the resource data transfer service, the start request carrying a state identifier of the first state and the resource data transfer service comprises a cross-regional resource transfer-in service;
executing a first service logic corresponding to the first state, to obtain an execution result of the first service logic, the first service logic comprises displaying, on a conversation interface, a notification message indicating that a resource data packet is received;
adjusting the state machine to a second state according to the execution result of the first service logic, and executing a second service logic corresponding to the second state to obtain an execution result of the second service logic, the second service logic including displaying, on a resource acceptance interface, a user name of a user initiating the cross-regional resource transfer-in service, a first resource data amount and a second resource data amount, the first resource data amount and the second resource data amount corresponding to resource types in different regions; and
outputting a service execution result of the resource data transfer service according to the execution result of the second service logic when the second state is a termination state, a service logic of the resource data transfer service comprising at least the first service logic and the second service logic.

16. The non-transitory computer storage medium according to claim 15, wherein the method further comprises:

adjusting the state of the state machine according to the execution result of the second service logic when the second state is a non-termination state, and outputting the service execution result of the resource data transfer service based on the adjusted state.

17. The non-transitory computer storage medium according to claim 15, wherein the state machine corresponds to a plurality of states, each state of the plurality of states corresponding to a process-oriented state determination condition, each state determination condition corresponding to a service logic, and the plurality of states comprising at least the first state and the second state; and the method further comprises:
traversing the state determination conditions corresponding to the plurality of states to determine the state determination condition corresponding to the first state; and
reading the service logic corresponding to the state determination condition of the first state as the first service logic.

* * * * *